(12) United States Patent
Szakelyhidi et al.

(10) Patent No.: US 9,527,411 B2
(45) Date of Patent: *Dec. 27, 2016

(54) CHILD RESTRAINT SYSTEM WITH AUTOMATED INSTALLATION

(71) Applicant: Thorley Industries LLC, Pittsburgh, PA (US)

(72) Inventors: David Szakelyhidi, Olympia, WA (US); Robert D. Daley, Pittsburgh, PA (US); Henry F. Thorne, Sewickley Heights, PA (US); Frederick Karl Hopke, Medway, MA (US); John J. Walker, Pittsburgh, PA (US)

(73) Assignee: Thorley Industries LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,735

(22) Filed: May 21, 2015

(65) Prior Publication Data

US 2015/0336480 A1 Nov. 26, 2015

Related U.S. Application Data

(63) Continuation of application No. 14/460,771, filed on Aug. 15, 2014, which is a continuation of application (Continued)

(51) Int. Cl.
*B60N 2/28* (2006.01)
*G01C 9/02* (2006.01)

(52) U.S. Cl.
CPC ........... *B60N 2/2806* (2013.01); *B60N 2/2821* (2013.01); *B60N 2/2887* (2013.01); *G01C 9/02* (2013.01); *B60N 2002/2815* (2013.01)

(58) Field of Classification Search
USPC ......... 297/256.13, 256.16, 256.1, 250, 217.3
See application file for complete search history.

(56) References Cited

U.S. PATENT DOCUMENTS 3,426,589 A 2/1969 Brendel
4,604,773 A 8/1986 Weber et al.
(Continued)

FOREIGN PATENT DOCUMENTS

KR 10-0320662 B1 3/2002
WO 2006009619 A2 1/2006

*Primary Examiner* — Timothy J Brindley
(74) *Attorney, Agent, or Firm* — The Webb Law Firm

(57) ABSTRACT

Provided is a child restraint system (CRS) with automated installation that provides automated feedback and control of seat installation angle, belt latching and tightening, and confirmation of correct install. The CRS utilizes sensors to monitor CRS base angle relative to level, confirm correct latching of the CRS to its base and then to the vehicle seat, and confirm tightening of the belts to the required tension to be crashworthy. The stepwise operation and confirmation of the installation procedure may be operated via button(s) or other tactical input, and relayed to the user via electronic visual display and/or audible means. All operations will be overseen and processed by an integrated control system, affording minimal user decision or interface. An intelligent latching device which can be adapted for use with an existing CRS is also provided.

16 Claims, 29 Drawing Sheets

Related U.S. Application Data

No. 13/315,867, filed on Dec. 9, 2011, now Pat. No. 8,840,184.

(60) Provisional application No. 61/543,938, filed on Oct. 6, 2011, provisional application No. 61/559,949, filed on Nov. 15, 2011.

(56) References Cited

U.S. PATENT DOCUMENTS

| | | |
|---|---|---|
| 4,709,960 A | 12/1987 | Launes |
| 5,054,739 A | 10/1991 | Wallin |
| 5,058,283 A | 10/1991 | Wise et al. |
| 5,470,002 A | 11/1995 | DiStefano et al. |
| 5,581,234 A | 12/1996 | Emery et al. |
| 5,728,953 A | 3/1998 | Beus et al. |
| 5,810,436 A | 9/1998 | Surot |
| 5,836,650 A | 11/1998 | Warner, Jr. et al. |
| 5,839,789 A | 11/1998 | Koledin |
| 5,890,762 A | 4/1999 | Yoshida |
| 5,960,523 A | 10/1999 | Husby et al. |
| 5,996,421 A | 12/1999 | Husby |
| 6,092,869 A | 7/2000 | Ziv |
| 6,139,101 A | 10/2000 | Berringer et al. |
| 6,170,911 B1 * | 1/2001 | Kassai ............... B60N 2/2821 116/215 |
| 6,318,799 B1 | 11/2001 | Greger et al. |
| 6,322,142 B1 | 11/2001 | Yoshida et al. |
| 6,347,832 B2 | 2/2002 | Mori |
| 6,508,510 B2 | 1/2003 | Yamazaki |
| 6,520,032 B2 | 2/2003 | Resh et al. |
| 6,522,257 B1 | 2/2003 | Jakob et al. |
| 6,539,590 B2 | 4/2003 | Ziv |
| 6,554,318 B2 | 4/2003 | Kohut et al. |
| 6,554,358 B2 | 4/2003 | Kain |
| 6,623,032 B2 | 9/2003 | Curtis et al. |
| 6,739,660 B2 | 5/2004 | Dukes |
| 6,739,661 B1 | 5/2004 | Dukes |
| 6,749,260 B2 | 6/2004 | Abel |
| 6,779,842 B2 | 8/2004 | McNeff |
| 6,889,146 B2 | 5/2005 | Sullivan et al. |
| 6,962,394 B2 | 11/2005 | Anthony et al. |
| 7,004,541 B2 | 2/2006 | Sedlack |
| 7,021,709 B2 | 4/2006 | Dolan et al. |
| 7,059,676 B2 | 6/2006 | McNeff |
| 7,224,270 B2 | 5/2007 | Patterson et al. |
| 7,272,974 B2 | 9/2007 | Goto |
| 7,288,009 B2 | 10/2007 | Lawrence et al. |
| 7,401,834 B2 | 7/2008 | Browne et al. |
| 7,410,212 B2 | 8/2008 | Lawrence et al. |
| 7,410,214 B2 | 8/2008 | Hayden et al. |
| 7,422,283 B2 | 9/2008 | Patterson et al. |
| 7,439,866 B2 | 10/2008 | Wallner et al. |
| 7,463,161 B2 | 12/2008 | Griffin et al. |
| 7,478,875 B2 | 1/2009 | Patterson et al. |
| 7,618,093 B2 | 11/2009 | Hung-Chung |
| 7,658,446 B2 | 2/2010 | Meeker et al. |
| 7,735,921 B2 | 6/2010 | Hutchinson et al. |
| 7,748,782 B2 | 7/2010 | Chen et al. |
| 7,810,220 B2 | 10/2010 | Anthony et al. |
| 7,819,472 B2 | 10/2010 | Hutchinson et al. |
| 7,837,275 B2 | 11/2010 | Woellert et al. |
| 7,887,129 B2 | 2/2011 | Hei et al. |
| 2002/0024205 A1 | 2/2002 | Curtis et al. |
| 2003/0025369 A1 | 2/2003 | Maciejczyk |
| 2003/0151281 A1 | 8/2003 | Williams |
| 2004/0174055 A1 | 9/2004 | Abel |
| 2005/0006934 A1 | 1/2005 | Rabeony et al. |
| 2005/0156452 A1 | 7/2005 | Biaud |
| 2005/0189805 A1 | 9/2005 | Burley et al. |
| 2006/0181124 A1 | 8/2006 | Kish |
| 2007/0296254 A1 | 12/2007 | Kahn |
| 2008/0061612 A1 | 3/2008 | Crampton |
| 2008/0246316 A1 | 10/2008 | Carine et al. |
| 2008/0303325 A1 | 12/2008 | Scholz |
| 2010/0013282 A1 | 1/2010 | Balensiefer |
| 2010/0078978 A1 | 4/2010 | Owens |
| 2010/0117417 A1 | 5/2010 | Foussianes et al. |
| 2010/0253498 A1 | 10/2010 | Rork et al. |
| 2011/0057489 A1 | 3/2011 | Greene |
| 2011/0074194 A1 | 3/2011 | Weber et al. |
| 2011/0074195 A1 | 3/2011 | Hei et al. |
| 2011/0089726 A1 | 4/2011 | Gibree |
| 2011/0089729 A1 | 4/2011 | Gibree |
| 2011/0089731 A1 | 4/2011 | Gibree |
| 2012/0007398 A1 * | 1/2012 | Fritz ............... B60N 2/2806 297/253 |
| 2013/0088058 A1 | 4/2013 | Szakelyhidi et al. |

* cited by examiner

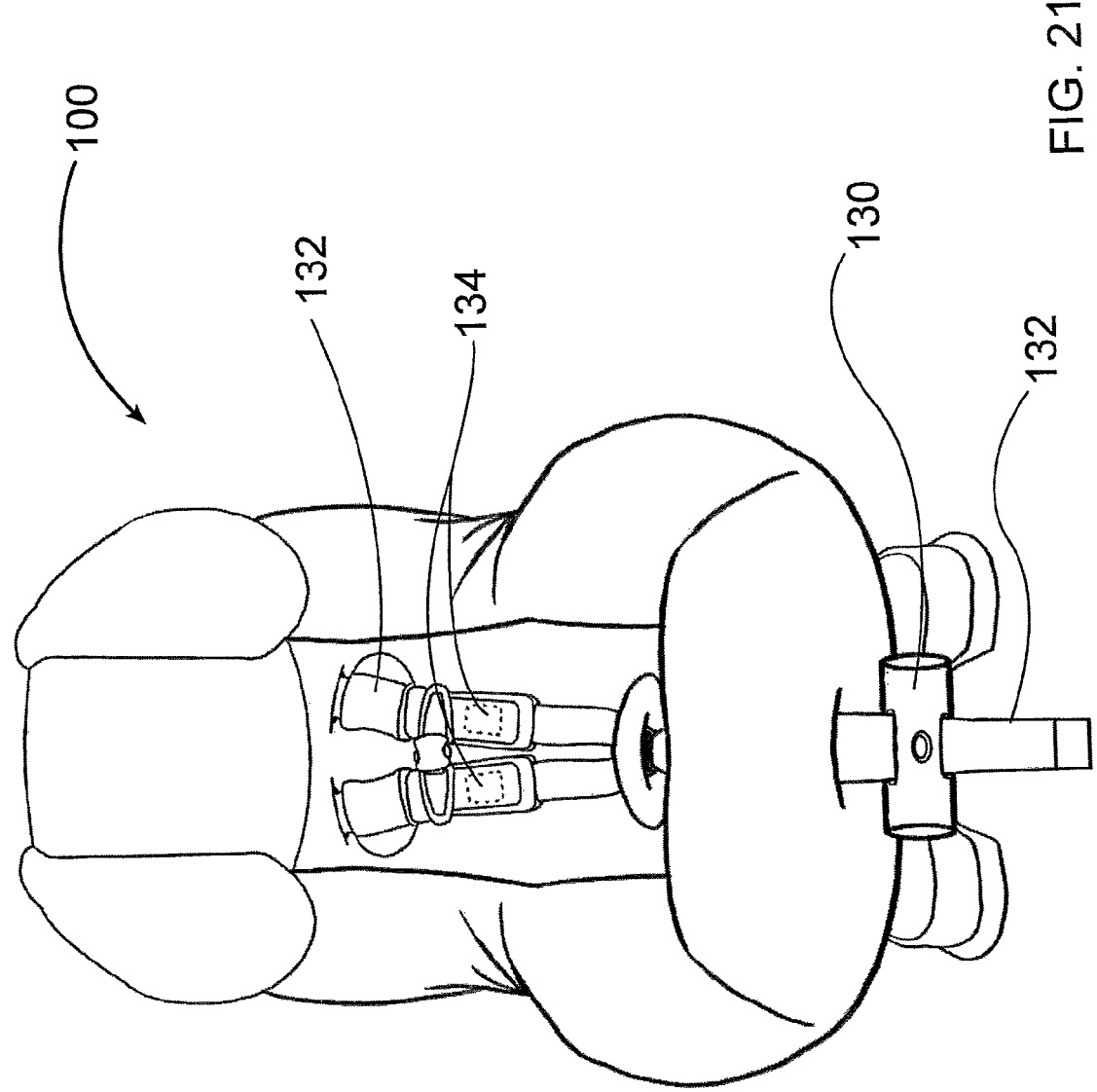

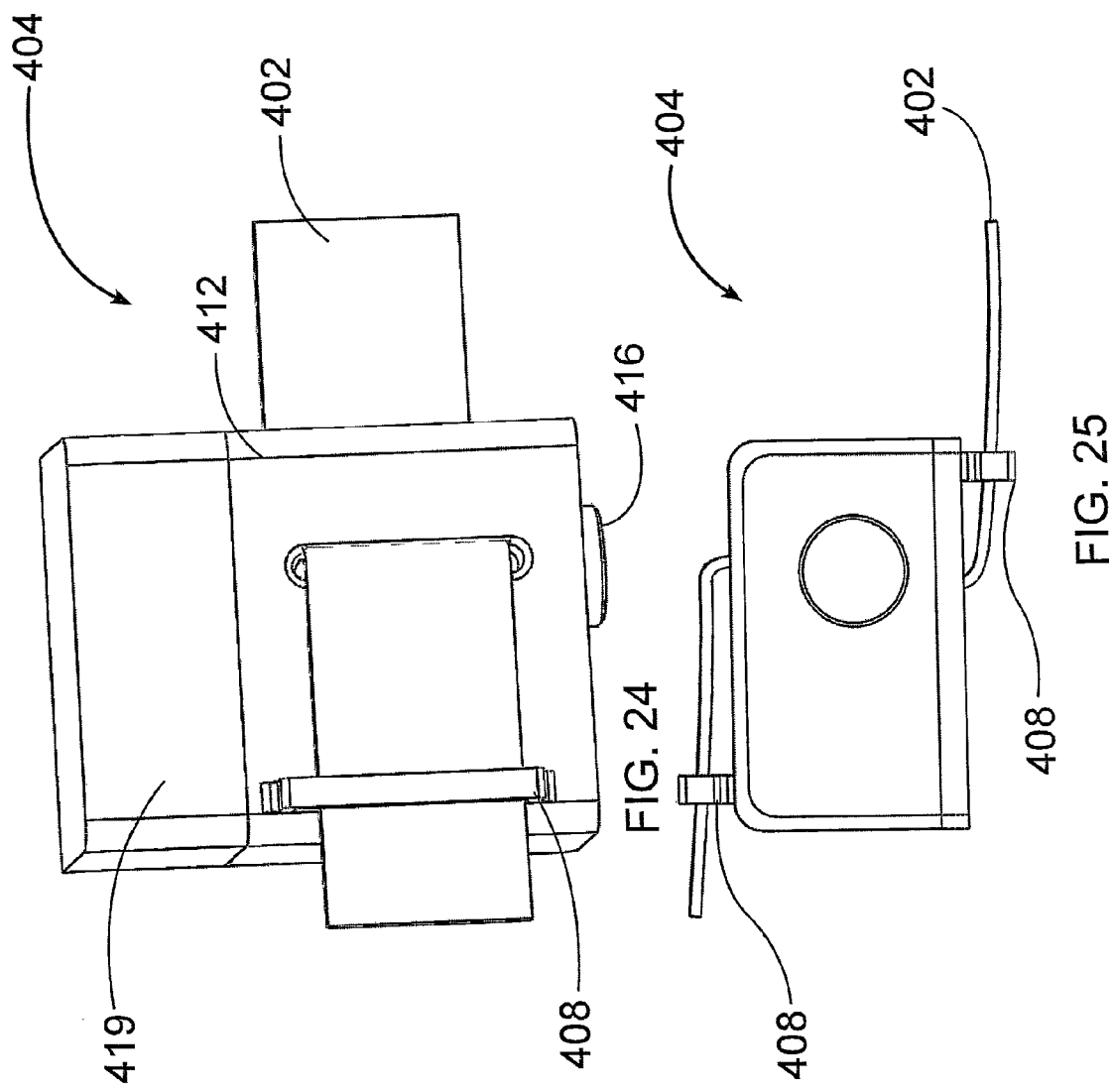

CHILD RESTRAINT SYSTEM WITH AUTOMATED INSTALLATION

CROSS REFERENCE TO RELATED APPLICATIONS

This application is a continuation of U.S. patent application Ser. No. 14/460,771, filed Aug. 15, 2014, entitled "Child Restraint System with Automated Installation", which is a continuation of U.S. patent application Ser. No. 13/315,867, filed Dec. 9, 2011, entitled "Child Restraint System with Automated Installation", now U.S. Pat. No. 8,840,184, which claims priority to U.S. Provisional Application No. 61/543,938, filed Oct. 6, 2011, and 61/559,949, filed Nov. 15, 2011, which are all incorporated herein by reference in their entirety.

BACKGROUND OF THE INVENTION

1. Field of the Invention

The present invention is generally directed to a child car seat or child restraint system (CRS) for use in an automobile and, more particularly, to self-adjusting and automatically installing a CRS.

2. Description of Related Art

Numerous industry and government guidance documents and standards recommend proper constraints for CRS installation. Aside from CRS manufacturer datasheets, pertinent information regarding standards and guidance can be found in three National Highway Traffic Safety Administration (NHTSA) reports, entitled, "Driver mistakes when installing child seats", "Misuse of Child Restraints", and "Child Restraint Use Survey: LATCH Use and Misuse". Also, FMVSS213 and 225 standards include testing and crashworthiness requirements for a CRS.

In addition, Federal Motor Vehicle Safety Standards state that after the CRS undergoes crash impact testing, the angle between the CRS's back support surface for the child and the vertical should not exceed 70 degrees. In order to minimize this angle of travel after crash impact and to prevent separation of the child from the CRS, manufacturers state that when installing a CRS in the rear-facing position, the child seat should be reclined at least 30 degrees from vertical and up to 45 degrees from vertical when the car is parked on a level surface. Because vehicle seats are at varying angles, it has become standard for most child restraint manufacturers to provide a means to level the child restraint seat in relation to the vehicle seat angle, in order to achieve this optimal CRS seat back angle range. Existing devices for leveling include mechanical legs, screw mechanisms, levers, spacers, platforms, and other non-automated means. All of these devices are hand actuated. There have also been a few limited attempts at a motorized CRS recliner. In relaying the angle of the seat to the user, there are numerous mechanical devices currently in use, including bubble floats, rolling balls, and other sight windows or pendulum indicators. Some electro-mechanical based angle feedback indicators are also currently in existence.

Modern child restraint systems can be connected to the vehicle by the vehicle seat belt or by the Lower Anchors and Tethers for CHildren (LATCH) system, which is integrated with the CRS, having specialized connectors and belts. It is required that either the LATCH system belt or the vehicle seat belt connect the CRS tight enough that it cannot move more than one inch side to side and front to back in relation to the vehicle seat to which it is attached. Many manufacturers use a simple belt cinch, while others rely on cranks and lever arms, or other mechanical means to assist a user in tightening. There are even a few devices that use motor actuated mechanisms to tighten the belt. As for determination of torque, there have been mechanical devices described, but only a few electro-mechanical means of feedback.

Feedback of the CRS infant carrier seat to its base and then to the vehicle have also been disclosed, however, the manner in which this connection has been determined has not been in the CRS latches themselves, but in the vehicle or infant carrier seat housing and also in the vehicle seat belt or latch anchor points.

A 2009 NHTSA study entitled Drivers' Mistakes When Installing Child Seats (DOT HS 811 234) mentioned that approximately 73% of child restraints were installed incorrectly. It also states that in 72% of these installs, the user assumed that they had correctly installed the CRS, while in fact it was wrong.

Accordingly, a need exists for a CRS installation system that can be more effectively achieved by automation, with less user error/inconvenience and greater safety.

SUMMARY OF THE INVENTION

Provided is a CRS with automated installation that provides automated feedback and control of seat installation angle, belt latching and tightening, and confirmation of correct install. More specifically, the CRS disclosed herein utilizes sensors to monitor CRS base angle relative to level, confirm correct latching of the CRS to its base and then to the vehicle seat, and confirm tightening of the belts to the required tension to be crashworthy. The stepwise operation and confirmation of the installation procedure will be operated via button(s) or other tactical input, and relayed to the user via electronic visual display and/or audible means. All operations will be overseen and processed by an integrated control system, affording minimal user decision or interface.

More specifically, provided is a child seat configured to be secured to a seat of a vehicle. The child seat includes: a seat base secured to the seat of the vehicle; a child receiving portion supported by the seat base; a belt tensioning system incorporated into the seat base for receiving a belt that couples the seat base to the seat of the vehicle; a leveling system incorporated into the seat base for leveling the seat base relative to the seat of the vehicle; and a controller operatively coupled to the belt tensioning system and the leveling system. The controller activates the belt tensioning system and the leveling system such that the belt tensioning system tensions the belt to a predetermined tension and the leveling system levels the seat base to a predetermined angle relative to the seat of the vehicle.

The controller may be configured to activate the belt tensioning system and the leveling system iteratively, simultaneously, or sequentially. The belt received by the belt tensioning system may be a seat belt of the vehicle or a belt of a LATCH system. The child seat may be selected from the group comprising: rear facing infant carriers; forward-facing and rear-facing convertible child seats; and booster seats with harnesses.

The child seat may further include: at least one sensor for determining tension of the belt received by the belt tensioning system; and at least one sensor for determining the angle of the seat base relative to the seat of the vehicle. The at least one sensor for determining tension and the at least one sensor for determining the angle may be operatively coupled to the controller. The controller may activate the belt tensioning system and the leveling system such that the belt tensioning system tensions the belt to a predetermined tension and the leveling system levels the seat base to a predetermined angle relative to the seat of the vehicle based on feedback from the at least one sensor for determining tension and the at least one sensor for determining the angle.

A user interface may be positioned on at least one of the seat base or the child receiving portion to allow a user to initiate the belt tensioning system and the leveling system. The user interface may provide feedback to the user of a status of the child seat. The leveling system may be configured to raise and lower a foot connected to a bottom surface of the seat base.

In addition, provided is a child seat configured to be secured to a seat of a vehicle. The child seat includes: a seat base secured to the seat of the vehicle; a child receiving portion supported by the seat base; a leveling system incorporated into the seat base for leveling the seat base relative to the seat of the vehicle; and a controller operatively coupled to the belt tensioning system and the leveling system. The controller receives feedback from at least one sensor associated with the child seat of an angle of the seat base relative to the seat of the vehicle and provides an indication to a user of the angle of the seat base relative to the seat of the vehicle.

The indication may be a visual indication provided on a display connected to at least one of the seat base or the child receiving portion. Alternatively, the indication may be at least one of a visual or audible indication that the seat base is positioned relative to the seat of the vehicle at an acceptable angle. The acceptable angle may be determined by the controller by comparing the angle of the seat base relative to the seat of the vehicle determined by the at least one sensor with a predetermined angle. The predetermined angle may be at least one of a factory set angle or an angle determined by calibrating the car seat relative to a surface on which the vehicle is resting. The leveling system may be manually activated to level the seat base to a predetermined angle. Alternatively, the leveling system may be activated by the controller to level the seat base to a predetermined angle based on feedback from the at least one sensor.

The child seat may further include a belt tensioning system incorporated into the seat base for receiving a belt that couples the seat base to the seat of the vehicle. The controller may be configured to receive feedback from at least one sensor associated with the belt that couples the seat base to the seat of the vehicle and provide an indication to a user of the tension on the belt. The belt received by the belt tensioning system may be at least one of a seat belt of the vehicle or a belt of a LATCH system. The belt tensioning system may be manually activated to tension the belt to a predetermined tension. The belt tensioning system may be activated by the controller to tension the belt to a predetermined tension based on feed back from the at least one sensor associated with the belt.

Also provided is a child car seat that includes: a seat base secured to a seat of a vehicle; an infant carrier removably connected to the seat base; a belt tensioning system incorporated into the seat base for receiving a belt that couples the seat base to the seat of the vehicle; a leveling system incorporated into the seat base for leveling the seat base relative to the seat of the vehicle; and a controller operatively coupled to the belt tensioning system and the leveling system. The controller activates the belt tensioning system and the leveling system such that the belt tensioning system tensions the belt to a predetermined tension and the leveling system levels the seat base to a predetermined angle relative to the seat of the vehicle.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

FIG. 21 is a front view of an infant carrier according to the present invention with a motorized mechanism to tighten/loosen a harness and harness tension sensors;

FIG. 24 is a perspective view of the latch and tensioner mechanism of FIG. 23;

FIG. 25 is a bottom view of the latch and tensioner mechanism of FIG. 23;

DETAILED DESCRIPTION OF THE PREFERRED EMBODIMENTS

Figure 1A:
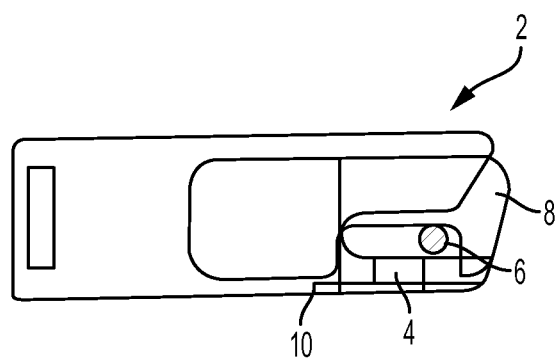
FIGS. 1A-1C provide several views of a LATCH device that incorporates a system for the confirmation of belt latching in accordance with the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

A CRS with automated installation embodying various aspects of the present invention is shown in FIGS. 1 through 23. It will be readily apparent to those skilled in the art, however, that the CRS of FIGS. 1 through 23 represents but one of a wide variety of structures, configurations and modes of operation of child restraints which fall within the scope of the present invention. For instance, the aspects of the present invention discussed herein may be incorporated into rear-facing infant carriers, forward-facing and rear facing convertible child carriers, and booster seats with harnesses and for use with lap/shoulder belts.

Figure 1B:
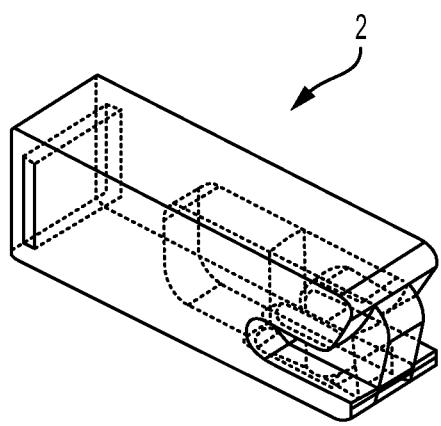
Figure 1C:
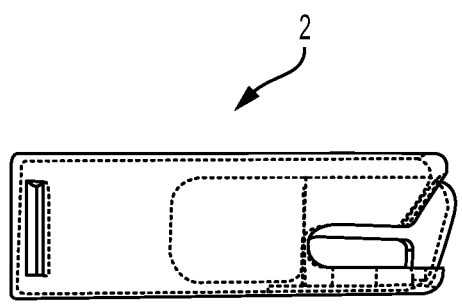

The CRS, according to the present invention, is firmly attached to a vehicle seat by a belt. In one embodiment, the CRS is configured for use with the Lower Anchors and Tethers for Children (LATCH) system, which has a European equivalent in the ISOFIX system. With reference to FIGS. 1A-1C, connectors 2 adapted for use with a LATCH device are illustrated. The connectors 2 incorporate a sensor 4 to detect the presence of the connection point, always a metal bar 6, within the engagement "jaws" 8 of the connectors 2. The sensor 4 may be an optical interrupt switch, contact switch, miniaturized metal detecting circuit, or other similar device. A wire lead 10 transmits a signal from the sensors 4 to a controller (not shown) provided on the CRS indicating that the connector 2 is attached to the bar 6 of the LATCH system. Alternatively, the CRS could be attached to the vehicle seat through other standardized CRS vehicle connection points such as a seat belt.

With reference to FIGS. 2 through 17, an infant carrier base of a CRS with automated installation is illustrated. The base of the CRS is adapted to firmly attach to a vehicle interior seat. The base 12 comprises a cradle shaped structure adapted to receive and hold an infant carrier (not shown), a belt 14 for anchoring the base to the vehicle seat, and a leveling mechanism 20 which levels the base 12 relative to the vehicle seat thereby ensuring that the infant carrier is held at a level orientation.

Figure 2:
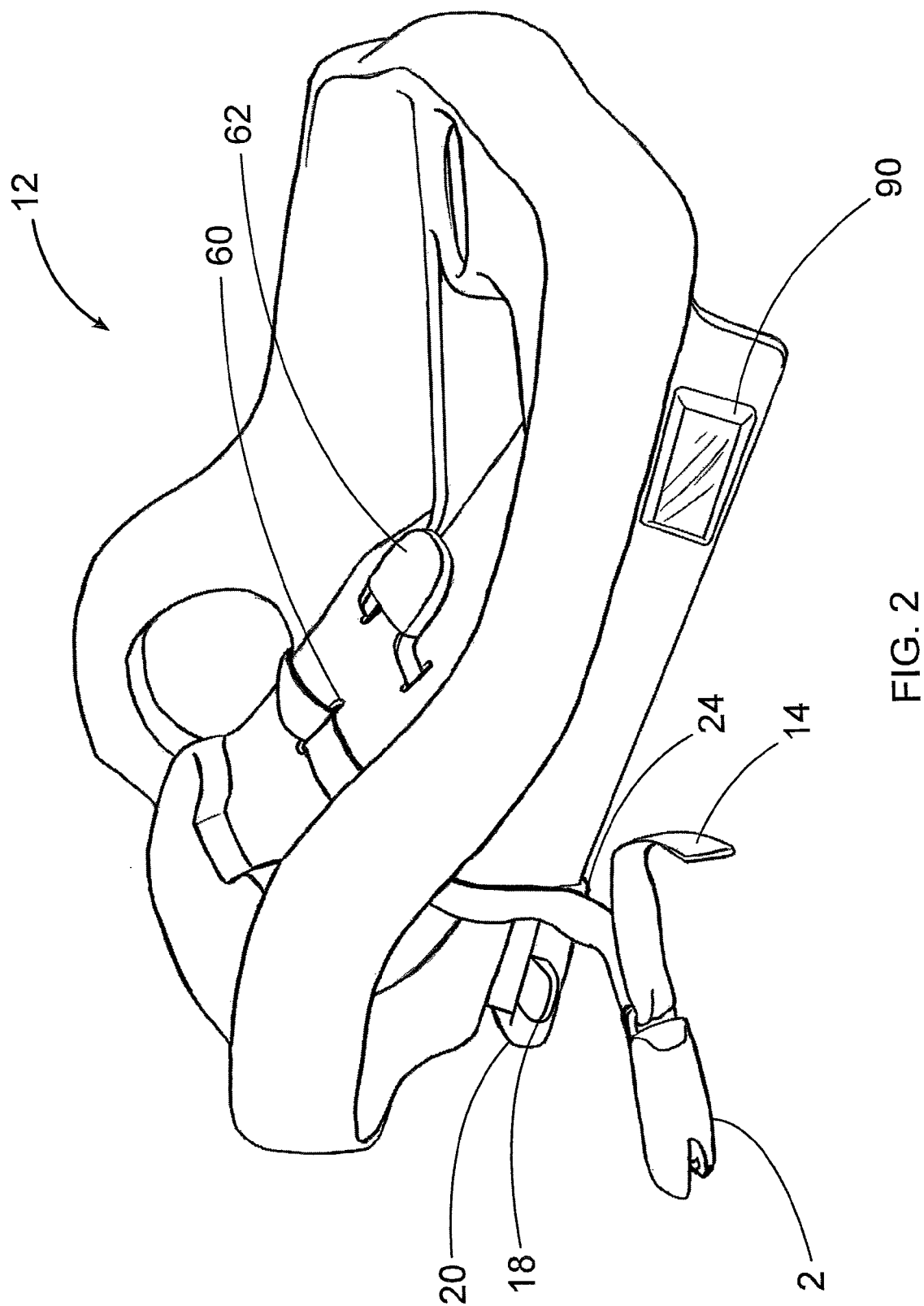
FIG. 2 is a perspective view of a carrier base and LATCH device embodying various features of a CRS according to the present invention.

As shown in FIG. 2, the belt 14 extends from the connectors 2 located on either side of the CRS through holes located on the side of the base structure, and to a tensioning mechanism 60. The leveling mechanism 20 extends from the lower portion of the base 12 to counteract the slope (theta) of a vehicle seat. A foot 24 is located at the base of the leveling mechanism 20. A height adjust manual release 18 extends from the base of the foot allowing a user to adjust the height manually. Optionally, the tensioning mechanism 60 is a motorized tensioning device for automatically adjusting the tension of the belt 14. In the case of an automated tensioning mechanism, the base 12 may further comprise a manual release 62 extending from the base 12 allowing a user to release the belt 14 from the automated mechanism and to adjust tension manually using overdrive crank 78. The base 12 further comprises a user interface having a control center 90 such as a visual display for displaying visual data for a user. Relevant data includes, for example, an indicator light informing the user of whether the seat is level, whether the base is securely anchored to the vehicle seat by the connectors, and whether a harness securing the child to the infant carrier is securely in place. The control center may also include input devices allowing a user to input data regarding the child to be secured to the CRS.

With reference to FIGS. 3 through 8, as described above, a CRS of the present invention includes a system for automatically leveling the CRS and providing angle feedback to a user. According to one embodiment of the automated leveling system, shown in FIGS. 3 through 5, the leveling mechanism 20 comprises a foot 24 extending from the carrier base 12. The foot 24 extends in a downward direction rotating around a rotational joint 22. The advantage of the rotational joint 22 is that there is the ability to achieve a greater amount of motion of the foot 24 with a smaller amount of motion of a drive mechanism. In this way, the challenge of extending the foot beyond the height of the seat base is effectively mitigated.

Figure 3:
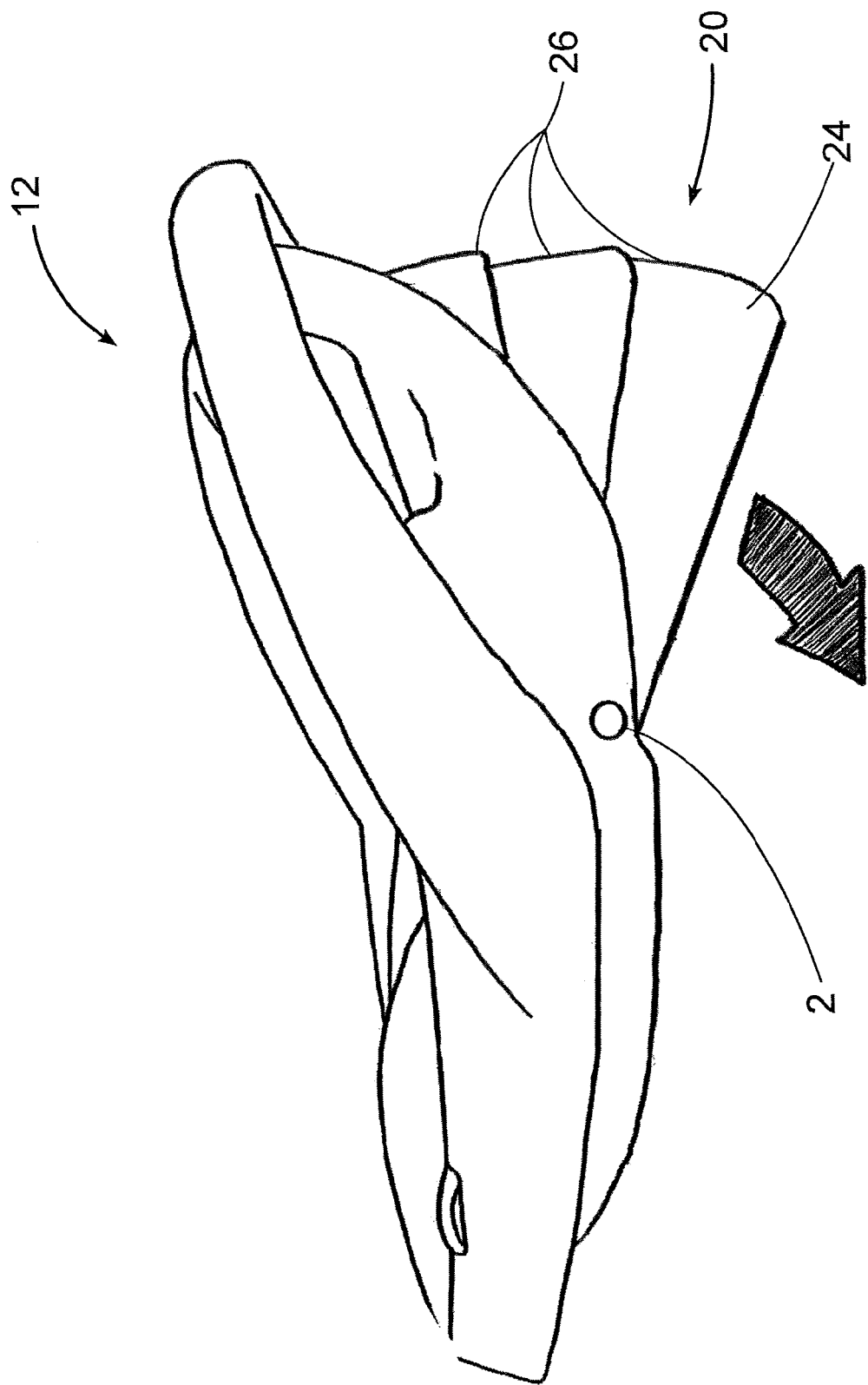
FIG. 3 is a side view of the carrier base of FIG. 2 with an elevating foot which rotates around a central pivot point in the extended position.
Figure 4:
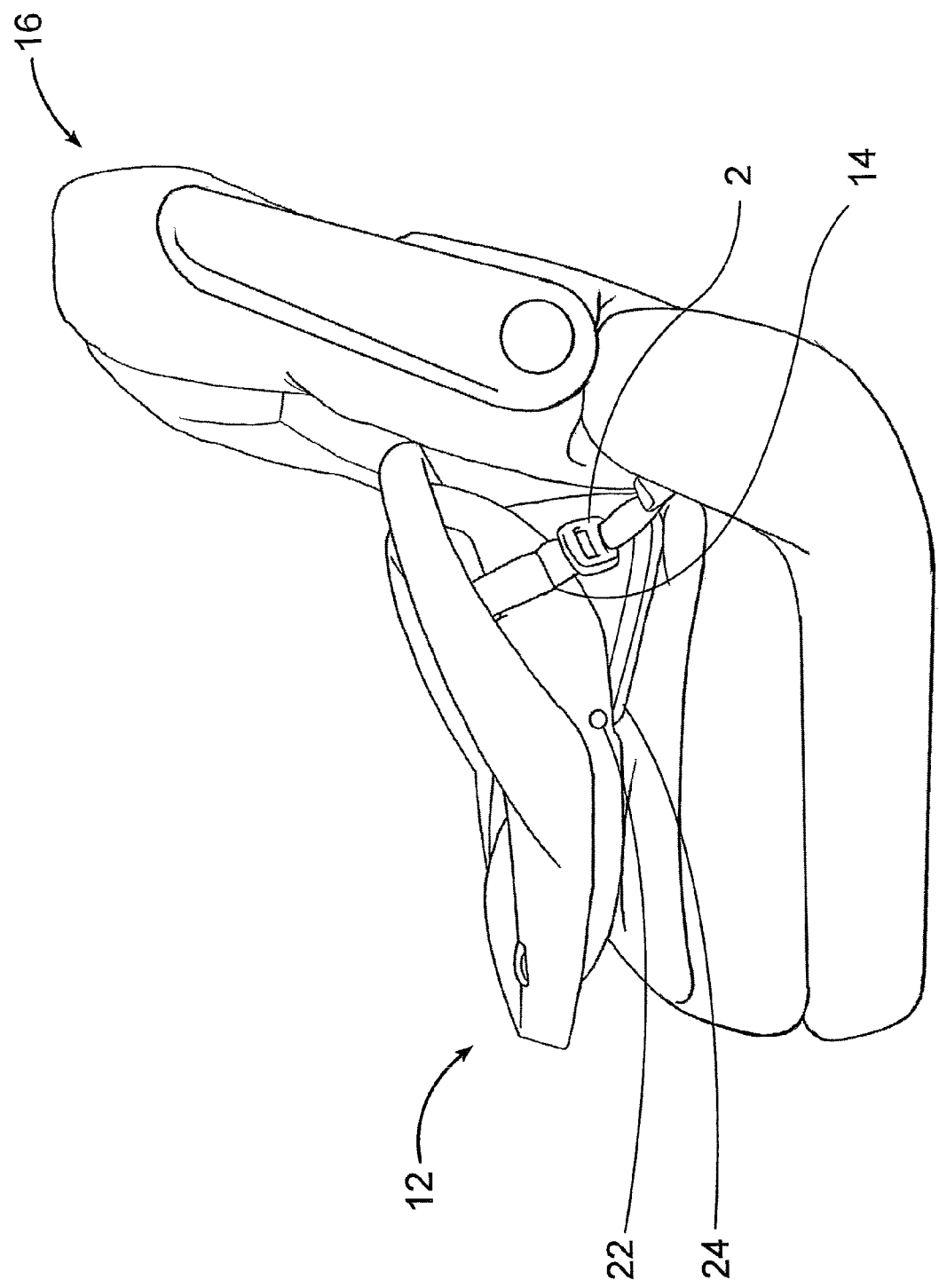
FIG. 4 is a side view of the carrier base with the elevating foot in the extended position of FIG. 3 installed in a vehicle seat.
Figure 5:
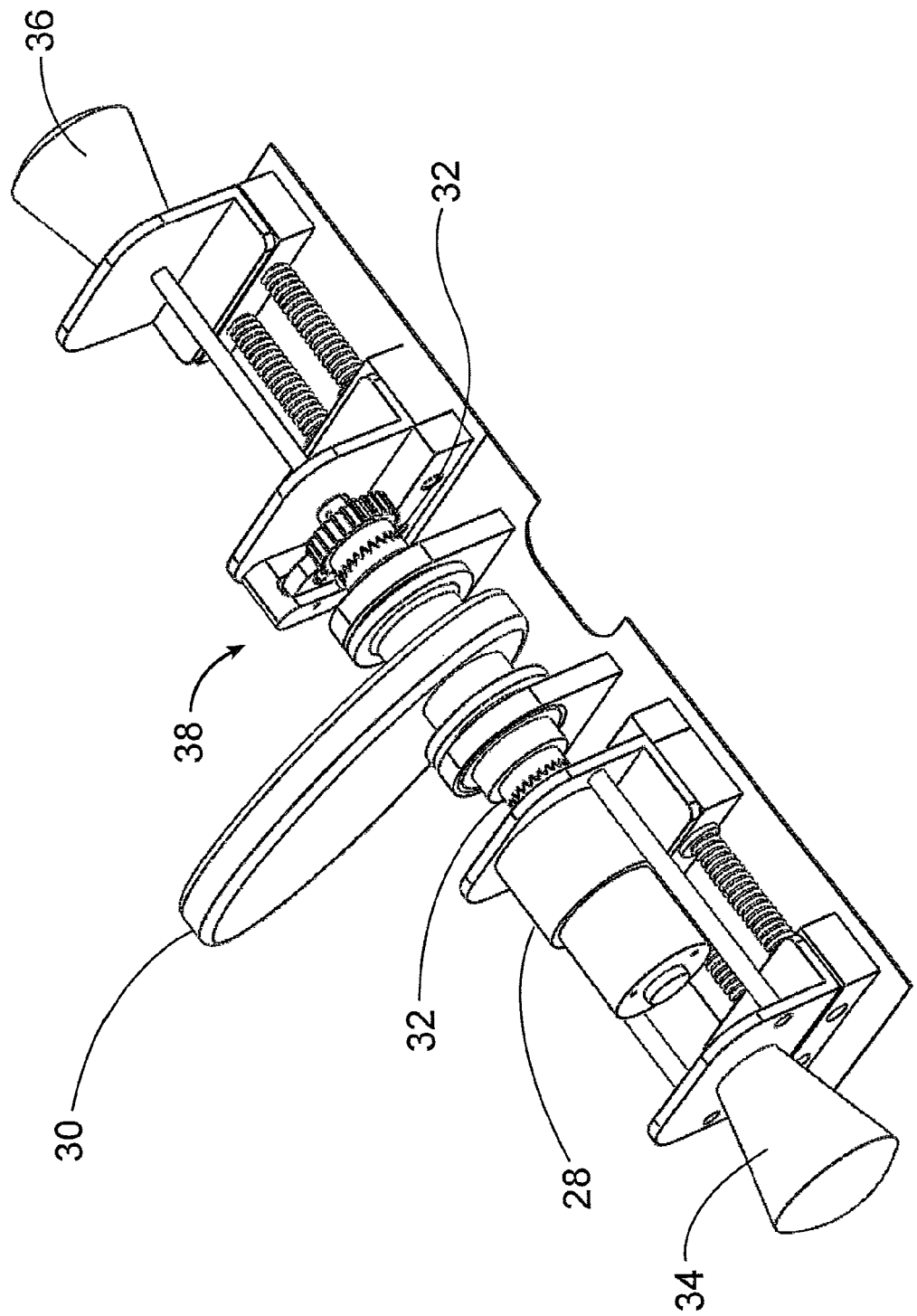
FIG. 5 is a bottom-side perspective view of a leveling mechanism for use with the CRS in accordance with the present invention with a motor and cam assembly for driving the elevating foot to an extended position.

As depicted in FIG. 3, the foot 24 extends from the lower portion of the infant carrier base 12 in a telescoping arrangement in which a plurality of elevating sections 26 are nested within one another when the foot 24 is in a closed position. As the foot extends downward, rotating around the rotation joint 22, the nested sections 26 disengage from one another. FIG. 4 depicts the base 12 with the foot 24 in the extended position installed in a vehicle seat 16. Optionally, as shown in FIG. 5, the leveling mechanism 20 includes a motor 28 for driving the expansion of the telescoping foot 24. The leveling mechanism including the motor is housed in the interior of the carrier base 12.

FIG. 5 depicts one embodiment of the leveling mechanism having a motor for automated leveling. The mechanism comprises the motor 28 engaged with a cam 30 by a Hirth coupling 32. The motor 28 used to power the cam 30 may be electrical or any other type, such as hydraulic. A Hirth coupling is a mechanical connection used to connect two pieces of a shaft together and characterized by teeth that mesh together on the end faces of each half of the shaft. As the motor 28 drives the cam 30, the cam 30 rotates thereby exerting force on the telescoping foot 24 causing the foot 24 to extend and the nested sections 26 of the foot to disengage. In addition to the cam mechanism, a screw jack mechanism, rack and pinion mechanism, scissor lift mechanism, or other type of linear motion mechanism may also be used to provide means of leveling the height via a rotational joint with a motor. In addition, rotary motion mechanisms to adjust height could also be used. Rotary motion mechanisms include a gearing mechanism, sprocket and chain mechanism, pulley and belt mechanism, or direct drive with a rotary motor.

It is desirable that the height of the infant carrier base be adjustable without a motor as well, in case the user is unable or unwilling to use the automated system. Manual release is accomplished by a release knob which disengages the cam from the motor. As shown in FIG. 5, the leveling mechanism 20 further comprises a manual release knob 34 and manual overdrive knob 36. The manual release knob 34 allows a user to disengage the motor 28 from the cam 30 thereby preventing the motor from supporting the cam 30, causing the foot 24 to return to the retracted position. Once the motor 28 is disengaged, a user can rotate the manual overdrive knob 36 to manually manipulate the height of the foot 24. Height may also be adjusted through other mechanical mechanisms such as, for example, a turn crank that actuates a spindle comprising part of a drive train or with a slip clutch mechanism.

It is desirable that the height adjustment system is not backdriveable so that, in the event of a crash, the forces are not transferred through the drive train of the actuating mechanism. In view of this concern, the leveling mechanism 20 further comprises a locking mechanism 38 with a ratchet, and pawl for securing the cam 30 in place once the desired height is reached.

Figure 6:
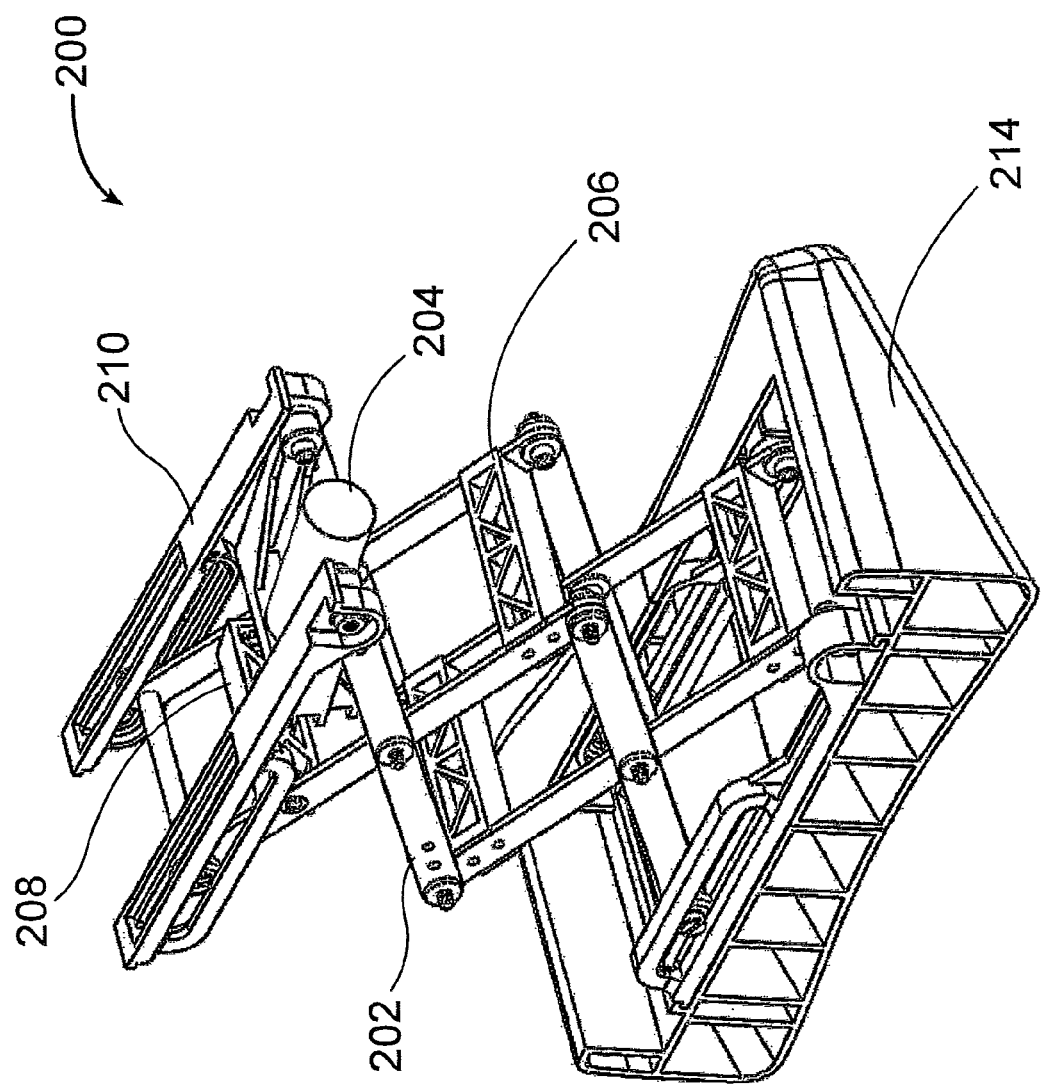
FIG. 6 is a perspective view of a leveling foot with a linear motion mechanism according to another embodiment of the present invention having a scissor mechanism for providing automated leveling and angle feedback.
Figure 7:
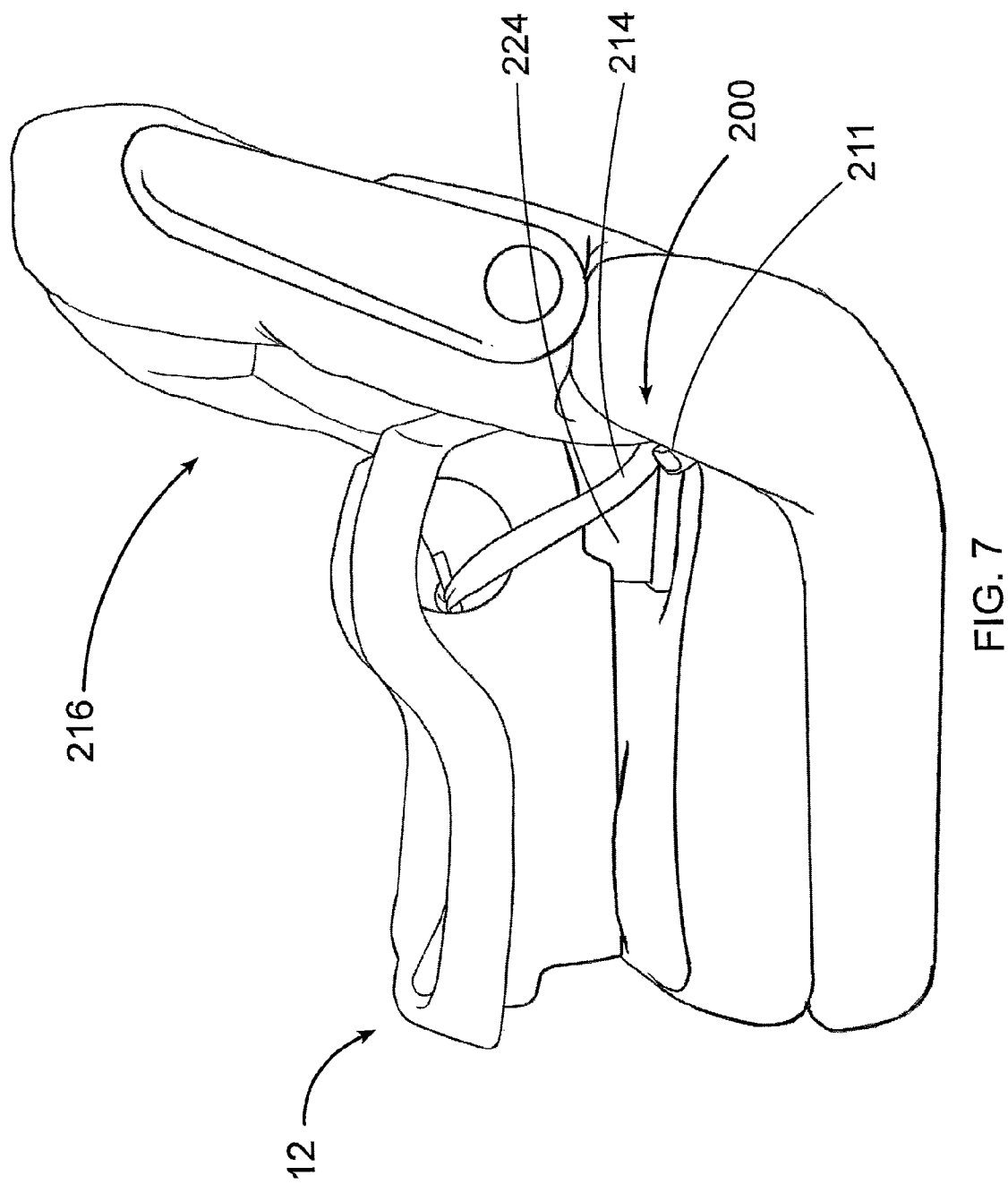
FIG. 7 is a side view of a linear motion leveling mechanism with a foot extending from the carrier base installed in a vehicle seat.

Alternatively, as shown in FIGS. 6 and 7, the CRS may include a liner extension mechanism 200 to adjust the height of the base 12. A liner extension mechanism relies on motorized leg(s), which can be raised or lowered to achieve the required optimal angle. As with the rotational adjustment mechanism, the extendable foot is driven by a motor. The motor used to power the legs may be of any type, electrical or other, such as hydraulic. The motorized legs may extend and contract by means of a screw jack mechanism, scissor jack, cable and pulley, chain, hydraulic/pneumatic piston, or other type of mechanical mechanism. As illustrated in FIG. 6, in one embodiment of the automated leveling system with linear extension mechanism, a scissor jack mechanism is utilized. The scissor jack comprises scissor legs 202, a motor and screw 204 for driving the movement of the legs 202, a stabilization bridge 206 extending between corresponding scissor legs 202, and a screw collar 208 engaged with the motor. The internal base of the CRS is mounted to the scissor legs 202 by mounting rails 210. FIG. 7 is a perspective view of the base 12 installed in a vehicle seat 216. The foot 224 is in the extended position. The CRS is attached to the vehicle seat 216 by connectors 211 attached to a connector belt 214.

For either the linear motion or rotational leveling mechanisms, it is desirable for the range of adjustment to exceed the height of the base. In this case, a telescoping or nesting covering is necessary to cover the mechanics throughout the entire range of extension. Furthermore, the rotational joint and linear elevation devices described above should not be construed as limiting the present invention as other mechanisms may be utilized to elevate and level the CRS.

Figure 8:
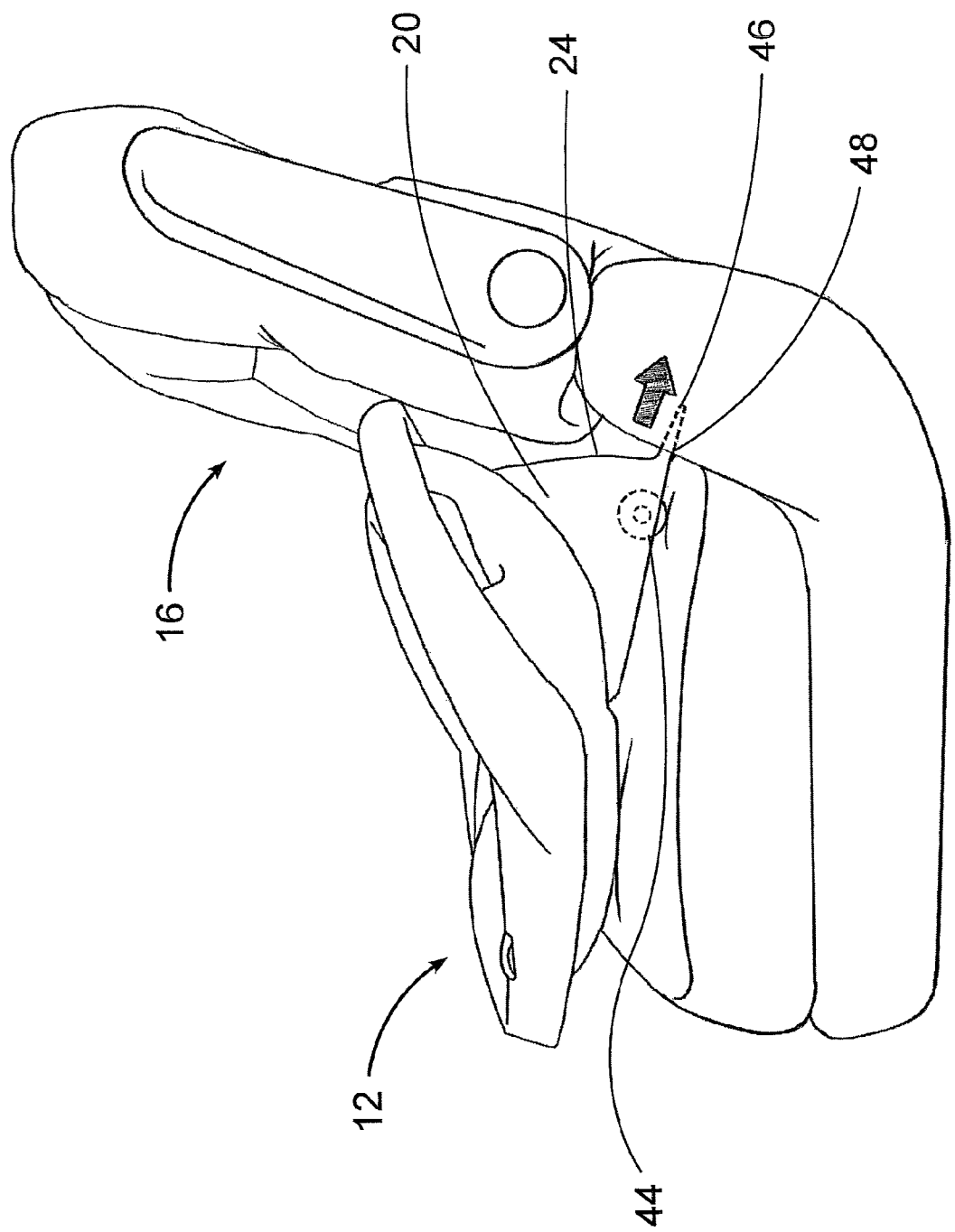
FIG. 8 is a side view of the carrier base of FIG. 2 installed in a vehicle seat having a roller attached to the foot and a lip extension that fits between the vehicle seat cushion and back for easier installation.

The interaction between the CRS foot and base and the vehicle seat is very important. In order to prevent the CRS leg or base from becoming jammed during the installation process, the portion of the CRS that interfaces with the seat may be shaped in a way to facilitate sliding the CRS into the correct position. According to one embodiment, as shown in FIG. 8, this is accomplished with wheels 44 for rolling the base to the desired location on the vehicle seat 16. A lip extension mechanism 46 extends from the foot 24. When the base 12 is installed, the lip extension mechanism 46 fits between the vehicle seat cushion and the back of the vehicle seat. A sensor 48 on the lip extension mechanism 46 records whether the CRS is in the proper position. Alternatively, a ski like plastic contour on the bottom of the CRS would be effective for sliding the CRS to the desired position.

In addition to use with the fully integrated CRS system described herein, the automated leveling system and tensioning mechanism are applicable to various formats of child restraint systems. These formats include, but are not limited to, rear facing infant carriers, forward-facing and rear-facing convertible child seats, booster seats with harnesses and those for use with vehicle lap/shoulder belts. These child restraint systems may or may not contain a separate base component.

The automated CRS of the present invention also includes an integrated mechanism for automatic tightening of the connector belt. FIGS. 9 through 14 depict this tensioning mechanism 60 for the CRS. The belt 14 extends from the connectors 2 to the CRS. The belt 14 is wound through and secured in place by the tensioning mechanism 60.

Figure 9:
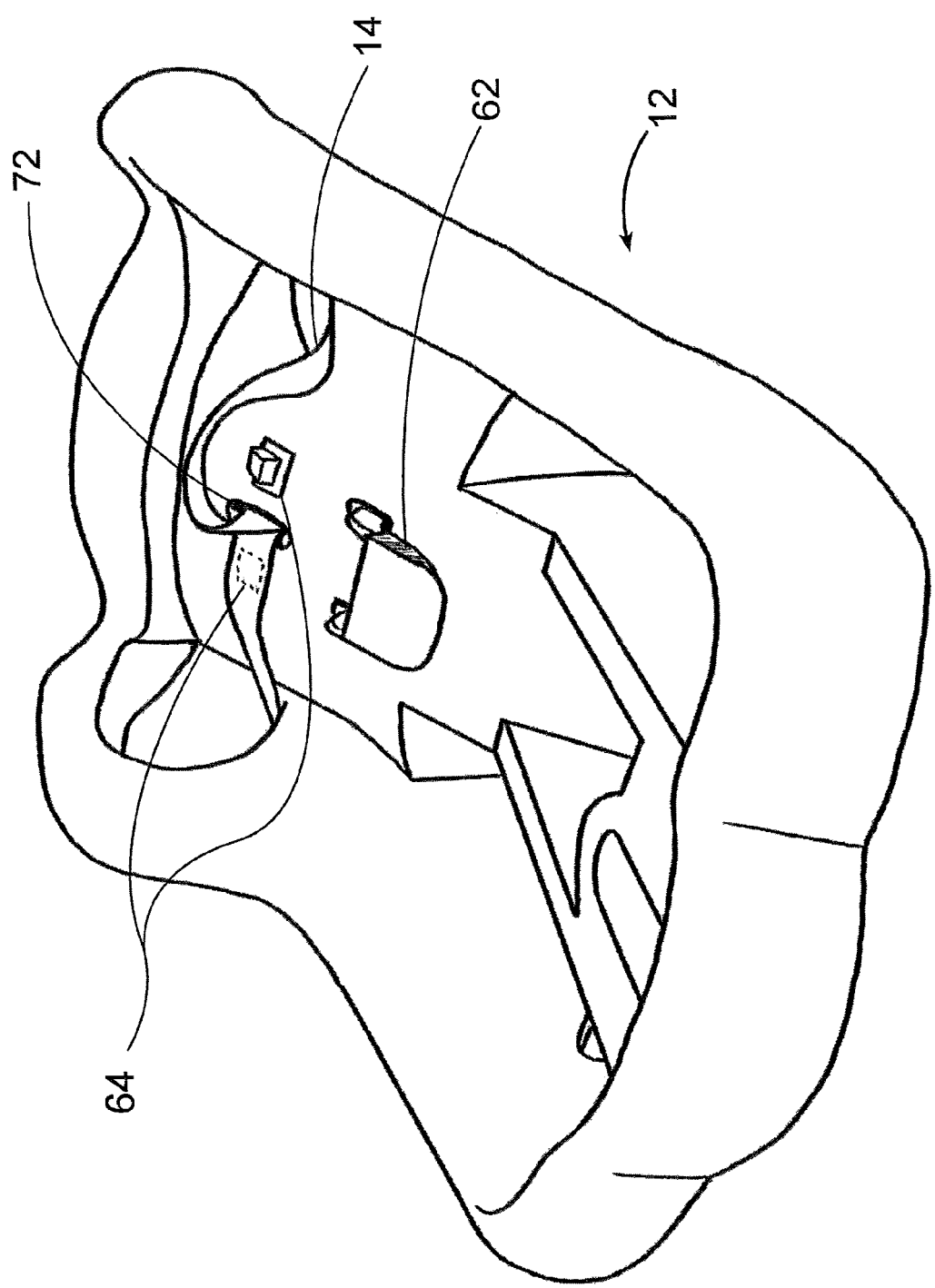
FIG. 9 is a perspective view of the carrier base of FIG. 2 with a belt for attaching the base to a vehicle seat and a tension detection sensor for measuring the tension on the belt.

As shown in FIG. 9, the tensioning mechanism 60 includes one or more tension detection sensors 64 located on the exterior of the carrier base 12 for measuring the tension of the belt 14 against the base 12 to ensure that the base is firmly attached to the vehicle seat. The belt 14 enters the tensioning mechanism 60 through a slot 72 located on the exterior of the carrier base 12. The manual release 62 is also located on the top of the base 12. A tension detection sensor is an electro-mechanical device for determining belt tension feedback. For instance, it is possible to mount strain gauge(s) or other load cell(s) to various support members of the CRS in order to measure forces which can be directly related to the tension of the connection belts. These gauges or load cells can be mounted to the support structures of the belt tightening mechanism, such that strains or loads on these members might be correlated to the tension of the belts as shown in FIG. 9. Alternatively, the gauges or load cells may also be mounted on the shaft of the belt tightening motor to relate torque deformation to belt tension. Alternatively, the gauges or load cells may also be mounted in the "legs" or other load bearing areas of the heightening mechanism or support structures, in order to determine forces related back to belt tension. The feedback from these torque and/or tension sensors is used to indicate to the CRS controller when the belt tightening motor/mechanism should be stopped due to reaching desired tension. Any combination of these measurement techniques can be used in concert to more accurately or robustly provide belt tension feedback.

Figure 10:
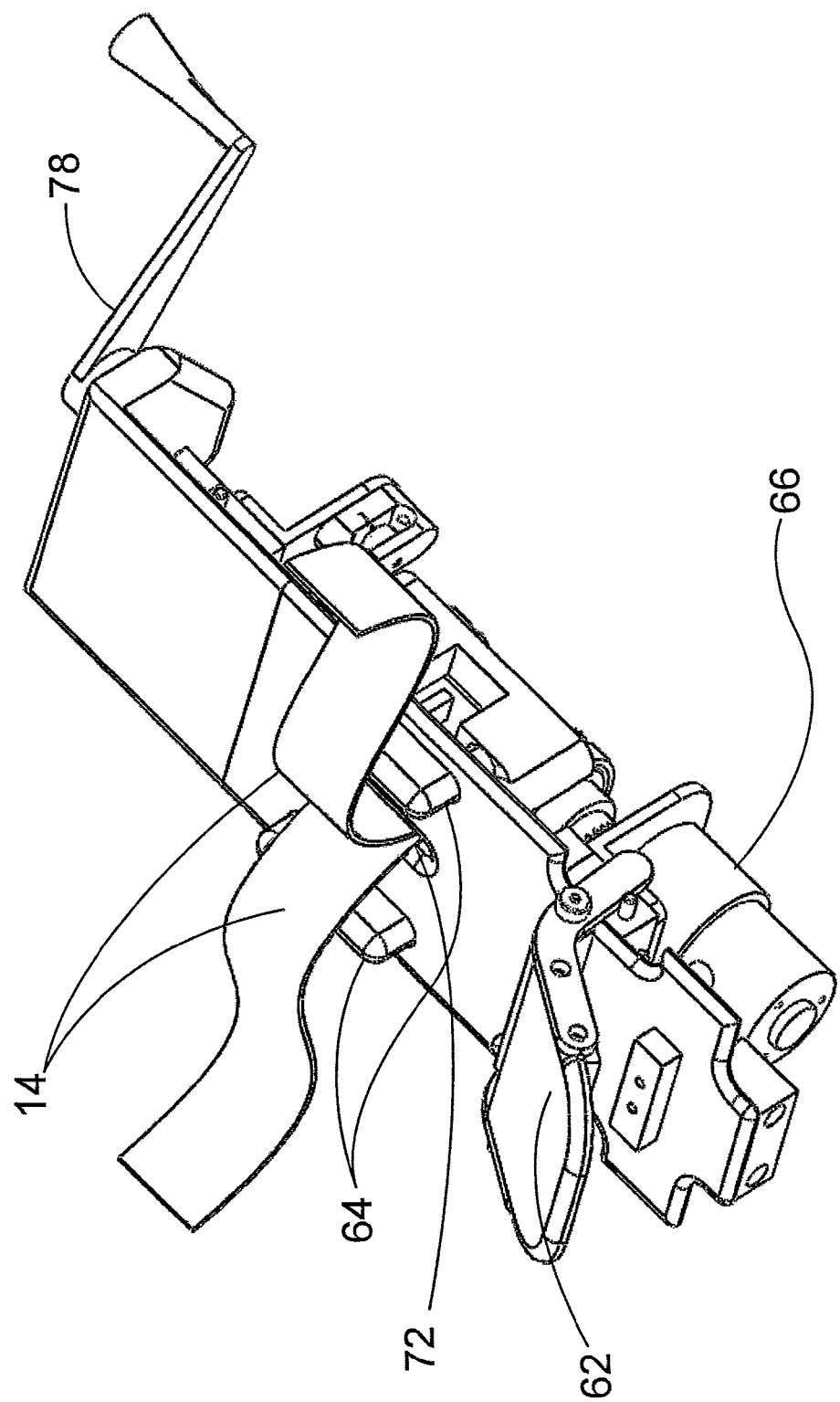
FIG. 10 is a top-side perspective view of a tensioning mechanism according to the present invention for automatically increasing the tension on a belt.
Figure 11:
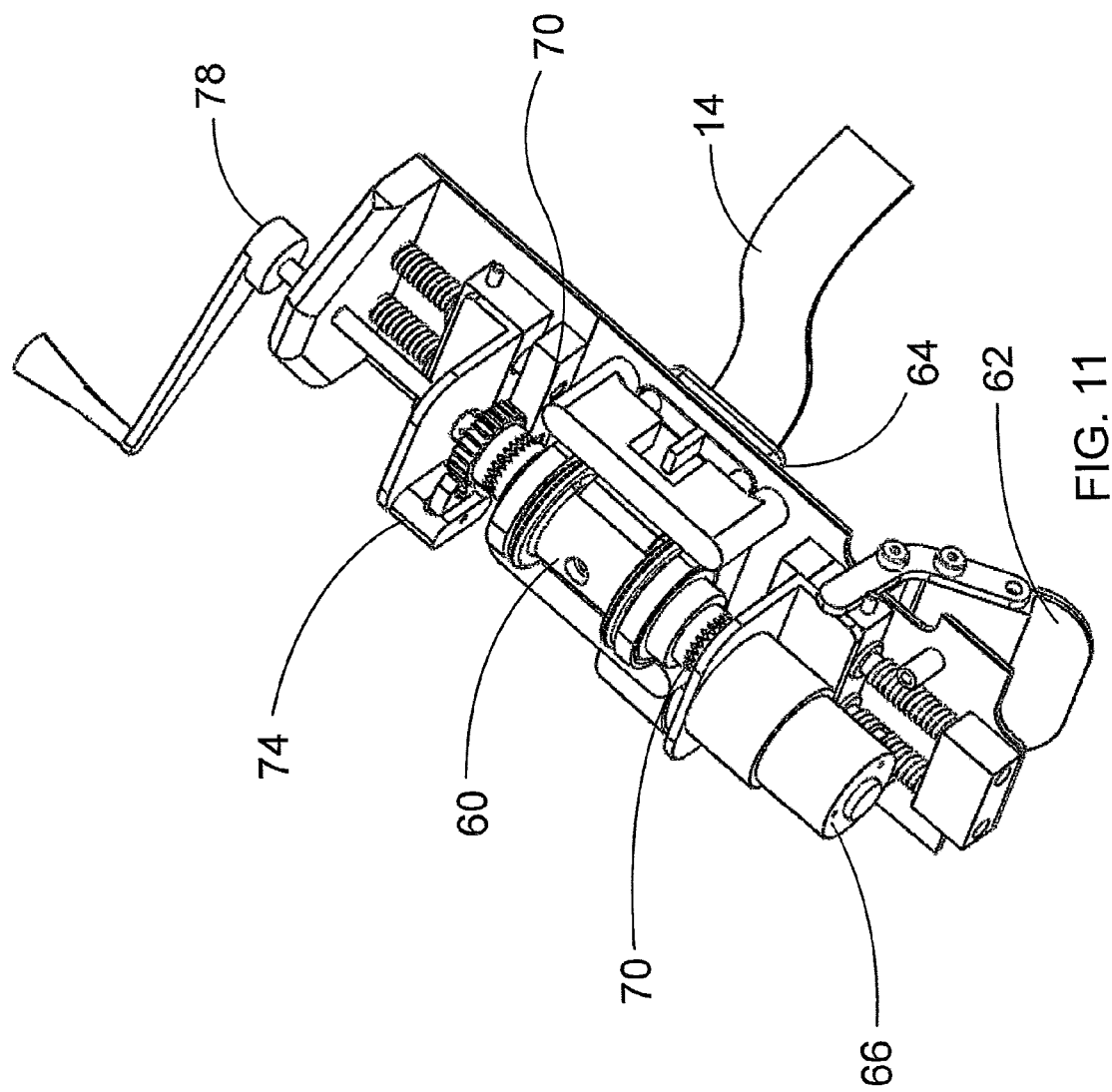
FIG. 11 is a bottom-side perspective view of the tensioning mechanism of FIG. 10 showing the belt wound around a belt tightening spindle and a latching mechanism consisting of a pawl and ratchet for preventing "backdriving" of the belt.

FIGS. 10 and 11 are top-side view and bottom-side perspective views of the tensioning mechanism. The mechanism is located inside the carrier base 12. The tensioning mechanism 60 comprises a motor 66 which rotates a belt tightening spindle 68. The motor 66 is engagingly connected to the tightening spindle 68 by a Hirth coupling 70. In use, the belt 14 enters the tensioning mechanism 60 through a slot 72 in the base 12 located above the tensioning mechanism. Where the motor is controlled by a driver interfaced with the automatic control system of the CRS, the motor control is configured to monitor electrical current draw. The measurement can be used to determine the torque on the motor which is directly related to tension on the belt. Additionally, the measurement can be used to detect increase in current draw, indicating obstructions to the associated motor mechanism. Alternatively, the tension sensors 64 are used to monitor the tension of the belt 14.

Figure 12:
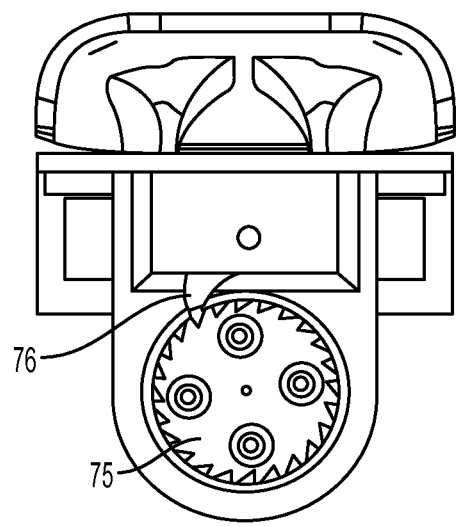
FIG. 12 is a side view of the pawl and ratchet mechanism of FIG. 11.

One challenge in designing the belt tightening mechanism is that ideally the tightening mechanism should not be required to withstand crash forces to achieve appropriate safety standards. Having to account for crash forces would add significant cost and complexity to the design of the drive system. Instead, configuring the drive system as a non-backdriveable system satisfies necessary safety levels without the added complexity of needing to configure the mechanism to withstand crash forces. Although there are many such non-backdrivable drive mechanisms, the preferred embodiment according to the present invention uses a motor 66 to operate a locking mechanism 74 comprising a ratchet 75 and pawl 76. Alternatively, a motor could pull a friction-based mechanism similar to existing belt tensioning mechanisms that are common in the art. As shown in FIG. 11, the locking mechanism 74 is located between the spindle 68 and a manual overdrive crank 78. FIG. 12 depicts a more detailed view of the ratchet and pawl mechanism in which the belt tightening ratchet 75 is contacted by the spring loaded pawl 76. The pawl 76 prevents the ratchet 75 from rotating in a backwards direction.

When the drive mechanism is non-backdriveable, the system must be designed to allow for release of tension in some other manner so that the CRS may be removed from the vehicle seat. The belt tightening mechanism in FIGS. 10 and 11 can be manually disengaged in order to allow the user to uninstall the CRS. Although this could be automated by allowing the drive system to be reversible, for safety reasons, a manual approach is preferable. In this embodiment, a manual belt release latch 62 is located on one end of the tightening mechanism 60. Once the release latch 62 is engaged, a user can manually adjust tension using a manual overdrive crank 78 located on the other end of the tightening mechanism.

Figure 13:
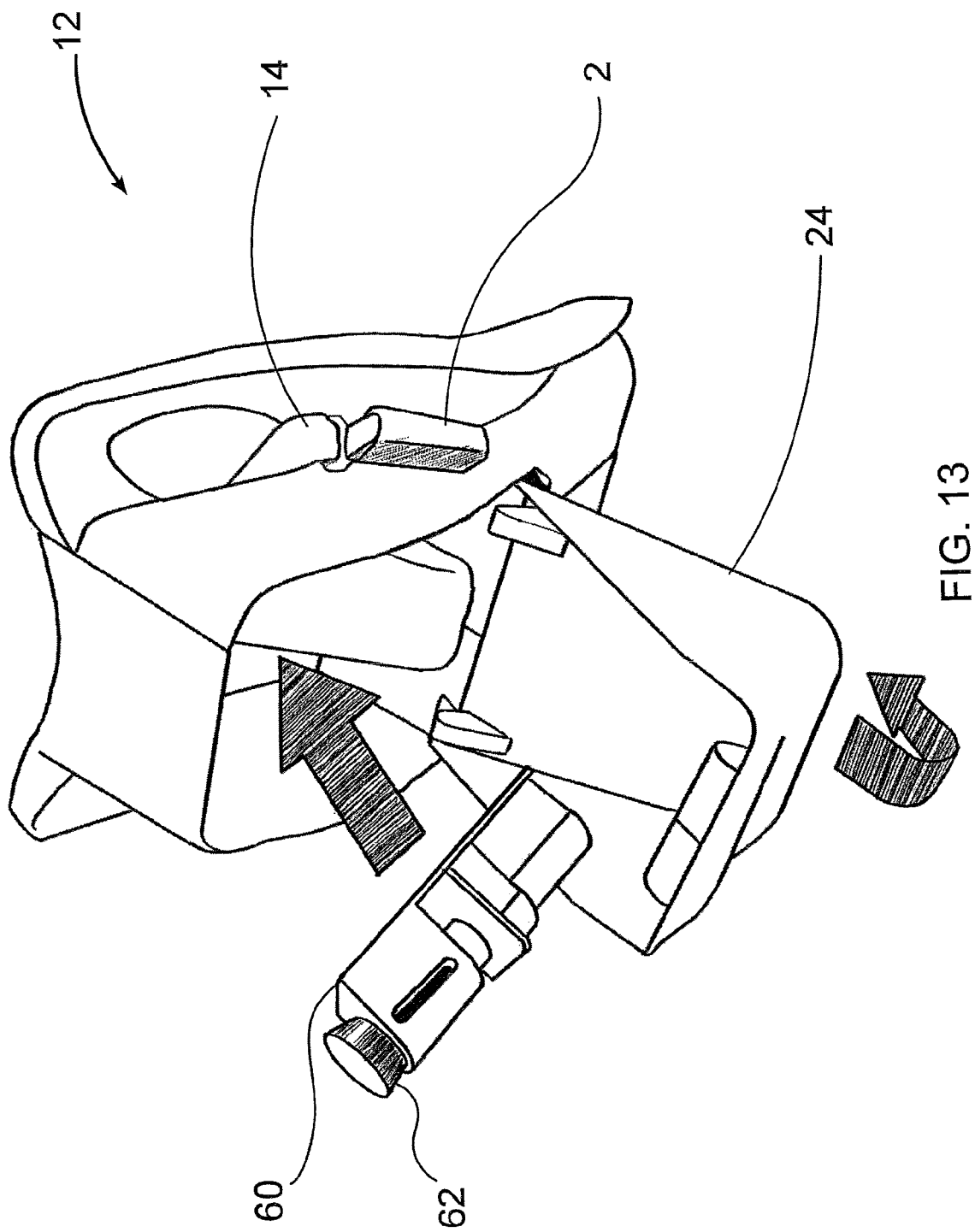
FIG. 13 is a perspective view of the bottom of the carrier base of FIG. 2 with a foot of the leveling mechanism in the open position, so that the tensioning mechanism is accessible.

As shown in FIG. 13, the motorized belt tightening mechanism 60 is located in the interior of the infant carrier base 12. The tightening mechanism is accessible when the foot 24 of the leveling mechanism 20 is in the open position.

Figure 14:
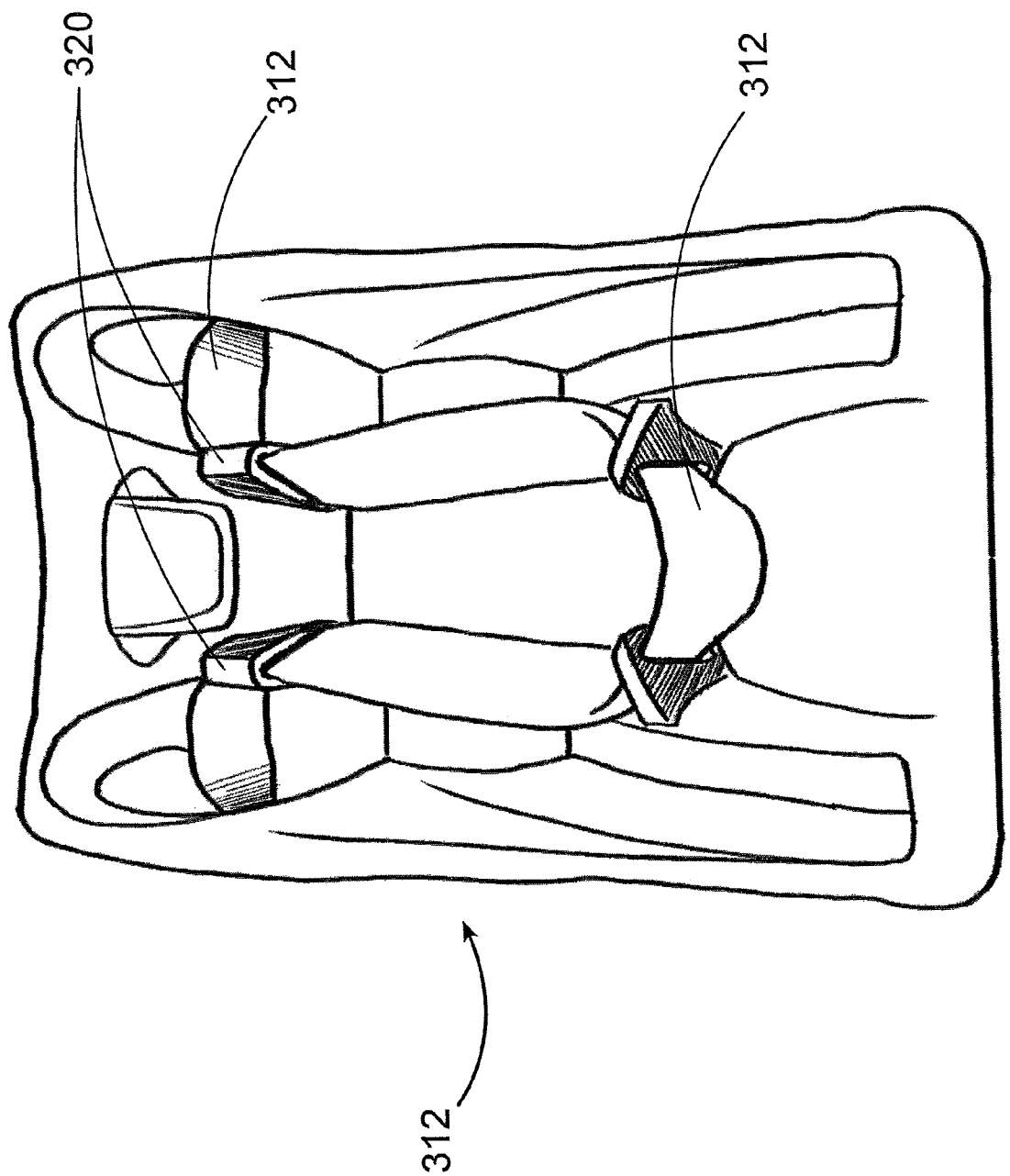
FIG. 14 is a perspective view of another embodiment of a carrier base with a belt in an improved routing configuration.

FIG. 14 depicts an alternate embodiment of the base and belt in which the belt 314 is held in a "routing orientation." The routing design allows the belt 314 to exert forces in both the downward and backward directions thereby more firmly attaching the base 312 to the vehicle seat. As shown in FIG. 14, the belt is attached to the carrier base by four loop holders 320 causing the belt to form a U-shaped curve.

A further challenge in the design of the drive mechanism is that the LATCH restraints connect on both the left and right sides of the CRS. Driving a single spindle fixedly attached to the CRS, for example, does not guarantee equal tension in both sides for all vehicle seat geometries. This may be acceptable for some cases, particularly if the attachment anchor points are well defined such as in the ISOFIX standard. In another embodiment, each side is motorized and tightened separately. This embodiment works particularly well for CRS systems that can be mounted forward or rear facing which often are designed with independently adjustable tethers. A third embodiment uses a single drive system that is not fixedly attached to the CRS. Instead, the drive system is mounted in such a way that it freely slides laterally between a set of end points or pivots in such a way that tension between the sides is equalized. The slideable mechanism is preferred due to the limited space available for the drive system. The drive system should be configured so as not to change the location of the child's center of gravity, nor to infringe on the child's space.

The functions of the leveling mechanism and tensioning mechanisms are directed according to an automated installation process. The automated installation process is controlled by a CRS controller comprising a microprocessor and associated electronics. The controller may be integrated into the CRS or self-contained and attachable to the CRS externally. The CRS controller may be wired or wirelessly interfaced with the various sensors disclosed. Some, or the entire control algorithm, may also be realized with discrete analog components in lieu of a digital microcontroller where possible.

Figure 15A:
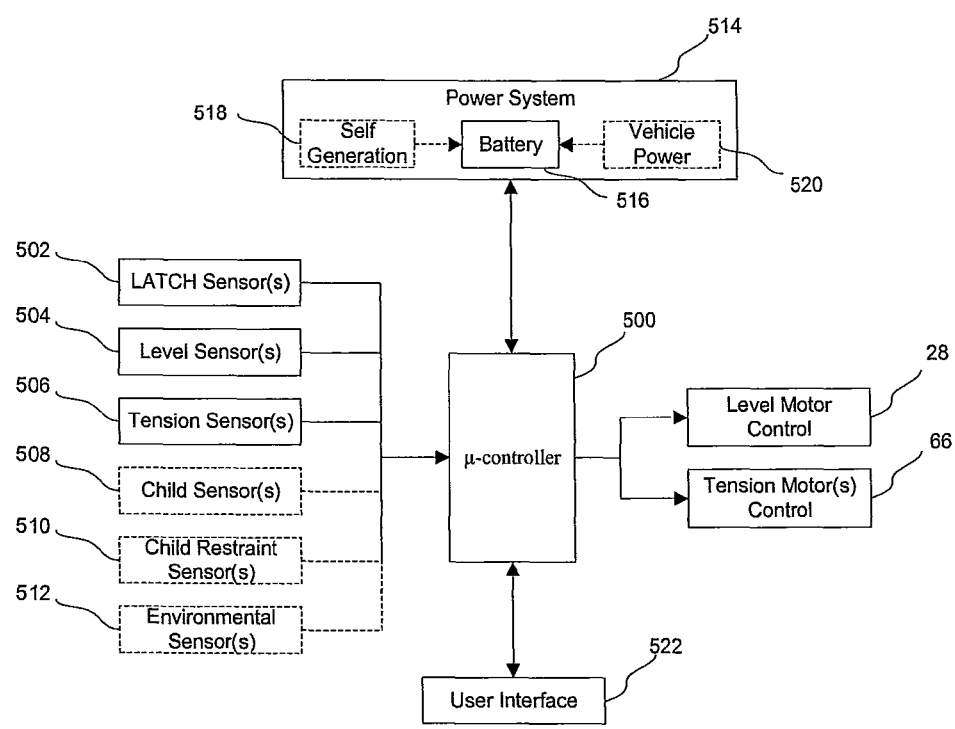
FIG. 15A is a block diagram of the electronic components of the CRS showing the relationship between the components and the microcontroller.

FIG. 15A is a block diagram of the microcontroller, sensors, and additional electronic components of a CRS according one embodiment of the present invention. As depicted in FIG. 15A, the microcontroller 500 receives input from latch sensors 502, level sensors 504, and tension sensors 506. Additional data may also be received from child sensors 508 located on the infant carrier including a child restraint sensor 510 and other environmental sensors 510 located throughout the CRS. The controller 500 receives power from a power system 514 such as a battery 516. Optionally, the controller 500 also receives power from a generator 518 responsive to the motion of the vehicle or from the vehicle itself through a power adapter connected to the vehicle's power outlet 520. The controller 500 may manage how power is stored and distributed to the electronic components of the CRS. Similarly the microcontroller 500 may reduce power consumption by turning sensors and motors on and off at appropriate times. The controller 500 is also in connection with the user interface 522. The controller 500 receives input from a user, such as the weight and age of the child, via the user interface 522. Based on the input data, the installation and monitoring functions of the CRS may be adapted to better correspond to the size and age of the child to be secured. The CRS may also rely on input data to signal to the user how the CRS should be positioned and secured (e.g. front facing or backwards facing, secured using the LATCH system or a seat belt). Similarly, the controller 500 manages when and how data is displayed to a user on the user interface 522. The microcontroller 500 also manages when the leveling and tensioning motors 28, 66 are turned on and off according to an installation algorithm described in greater detail below.

In a NHTSA study and manufacturer literature, it is recommended that a vehicle be parked on level ground before installing a CRS. The automated leveling mechanism of the present invention approximates being parked on level ground by determining the slope of the vehicle. This angle is in reference to a known "level" ground, which would be a plane perpendicular to gravity. Since this reference point can be determined, it is unnecessary for the vehicle to be parked on a level surface during installation, as the control algorithm will compensate for an un-level ground surface by incorporating the degrees from actual level during leveling control. Feedback of the CRS angle is achieved by a single or multiple axis accelerometer(s), or other like sensor, with the ability to indicate its angle with respect to Earth's gravity, providing a graduated electrical analog or digital signal. This signal has sufficient resolution in order to make informed control decisions related to feedback of CRS angle. Ideally, a seat back angle between 30 and 45 degrees in respect to level ground should be achieved when the CRS is placed in a rear-facing position.

Figure 15B:
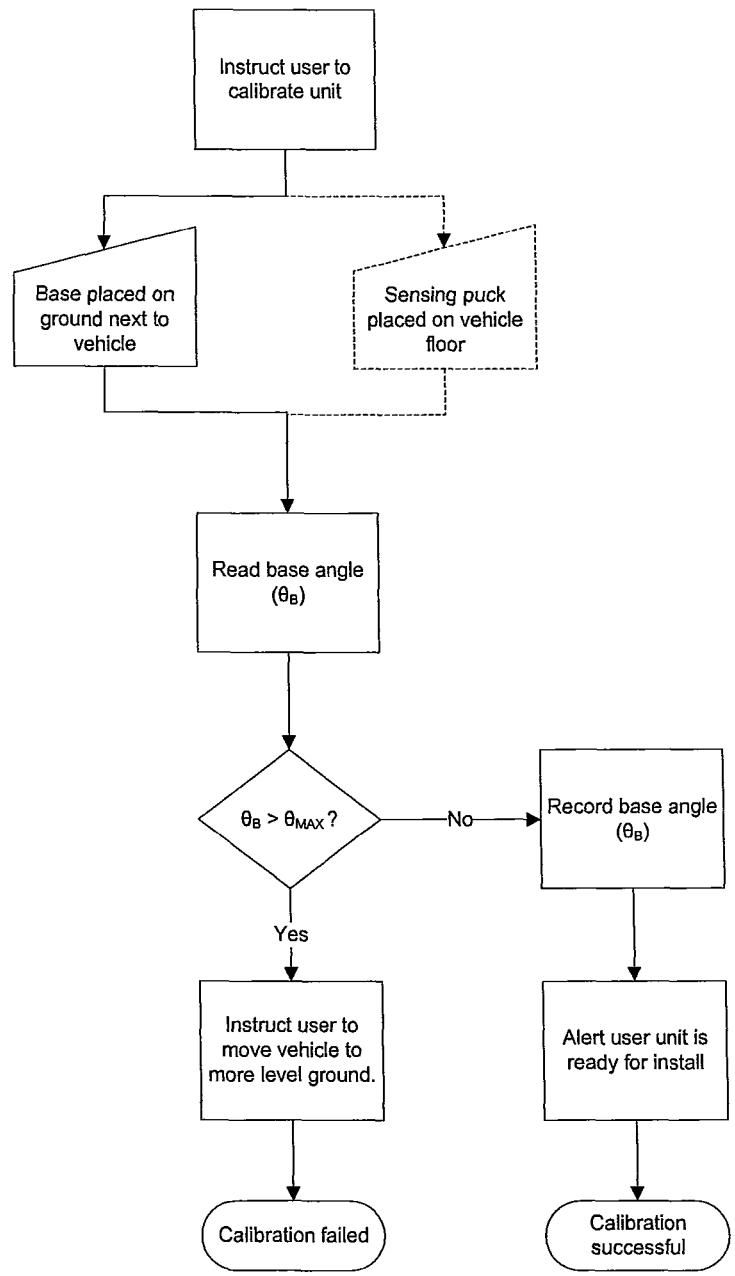
FIG. 15B is a flow chart describing the algorithm for calibrating a CRS according to the present invention.

The installation process begins with a calibration cycle. FIG. 15B is a flow chart depicting a calibration cycle as adapted for use with one embodiment of the CRS carrier. First, the user is instructed to place the CRS on the ground in a specific orientation parallel to the major axis of the vehicle. The angle of the ground relative to gravity is measured by the accelerometer.

A second option for determining the base angle is to have a reference puck that is independently moveable from the CRS but able to communicate via wires or wireless communication. This puck can be placed on a level surface such as the ground or the vehicle floor during the installation calibration portion. The puck should be designed in such a way that the intended orientation of the puck during this calibration process is readily evident.

A third related option to the puck is to have a foot extending from the CRS adapted to engage with the vehicle floor. The vehicle floor can be assumed to be level as a calibration surface. The relative angle between the foot at the base can be used to determine the reference angle. The leveling and tightening algorithms disclosed here could also be applied to a system without the calibration mechanism by instructing the user to first drive the car to a level pad similar to existing installation instructions.

Once the base angle ($\theta_B$) is determined, the CRS compares $\theta_B$ to a maximum angle ($\theta_{Max}$). The maximum angle is a preset value which represents the maximum slope on which a vehicle can be parked before it is unsafe to install the CRS. If the maximum angle is too great, the CRS instructs the user to move to more level ground before installing the CRS. If the slope is not greater than the maximum value ($\theta_B<\theta_{Max}$), the base angle ($\theta_B$) is recorded for use during installation. Then the user is alerted that the device is ready for install. At that point, the user places the carrier base on the vehicle seat, secures the connection belt to the LATCH system or other attachment mechanism such as a seat belt system, and begins the installation process by pressing an activation button located on the user interface.

Figure 15C:
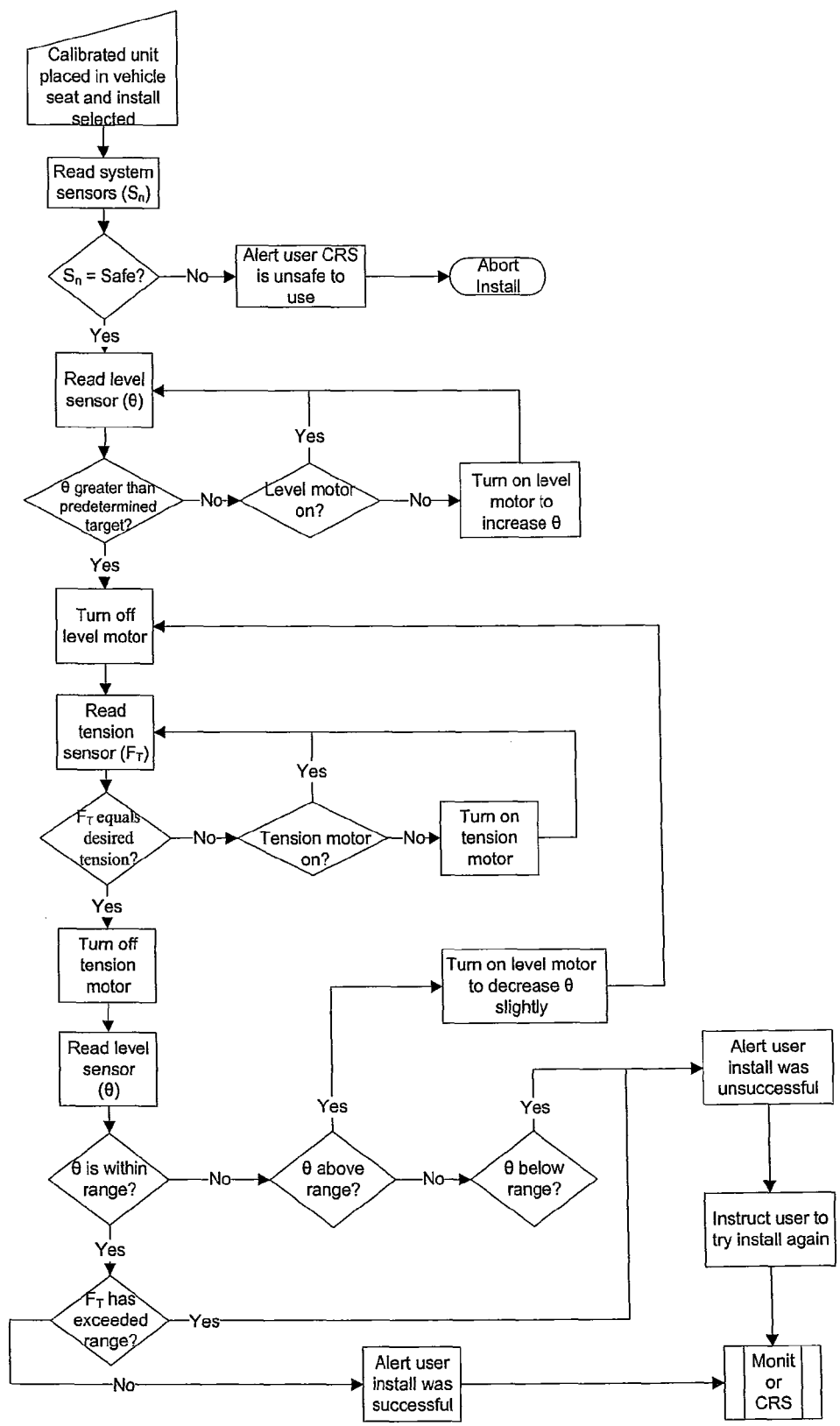
FIG. 15C is a flow chart describing the installation, leveling, and tensioning algorithm as used by a CRS according to the present invention.

One embodiment of the installation algorithm, as shown schematically in FIG. 15C, utilizes an iterative process in which foot elevation and tension are modified in small increments to arrive at a desired angle and belt tension level. FIG. 15C is a flow chart depicting this iterative process.

As described above, before the installation process is started, the CRS must be calibrated to determine the angle ($\theta_B$) of the ground on which the vehicle is parked. After calibration, a plurality of system sensors are read to ensure that the CRS is safe for use. This unique feature in the automated install process allows the system to prevent installation of a CRS that may not be safe. For example, since materials degrade (e.g., polymer hysteresis) over time, each CRS is given an expiration date at the time of manufacture. If the current date exceeds the expiration date, the CRS controller can either warn the user or prevent installation according to a predefined set of rules. Similarly, after a CRS is in a crash, even if there is no externally visible damage, internal damage may mean the seat is unsafe. By either monitoring an accelerometer in the X-Y plane or by use of a mechanical fuse that permanently deforms when subjected to a force in excess of a predetermined amount, the CRS controller can determine when the seat should no longer be used. In this case, the CRS system either warns the user or prevents installation entirely. Similarly, the CRS may alert the user that the vehicle is parked on such a steep grade (beyond 22 degrees) that it would be unsafe to install the CRS.

Optionally, at this point, the CRS control system can simplify the installation process by soliciting metadata from the user such as the child's age, height, or weight, or the vehicle in which the seat is being installed in order to recommend that the seat be installed forward facing or rear facing, where the shoulder straps need to be positioned, or the safest place to install the seat in this model of vehicle.

If sensors indicate that the device is safe ($S_n$=yes) then the automated system moves forward to the next installation step. At this point, a sensor reads the angle $\theta$. $\theta$ is the angle of the device in relation to actual level (e.g., a level perpendicular to gravitational force). The sensor is preferably a three axis accelerometer capable of measuring this orientation.

If $\theta$ is less than a calculated level, and the leveling motor is not already engaged, a signal is sent to the motor to turn on. Turning on the motor increases the height of the foot thereby increasing $\theta$. The calculated level is equal to the calibration angle $\theta B$ plus a predetermined overshoot value. The overshoot value means that the motor will continue to run elevating the base beyond the level position. Once $\theta$ equals the calculated level, the level motor is turned off.

After the level motor is turned off, the tension of the belt ($F_T$) is read by the tension sensor. Possible tension sensors include a strain gauge, a pressure gauge, or other mechanical sensor. In a similar feedback loop to the process for the leveling motor, if $F_T$ is less than the desired tension, the motor will continue to run until the desired tension is reached. Since the tension mechanism is non-backdrivable, if $F_T$ exceeds the desired tension, the installation fails and must be started again. In an iterative process, once the tension motor is turned off, the leveling angle $\theta$ is once again measured. If $\theta$ is within range (preferably defined as within 5 degrees of $\theta_B$), and $F_T$ has not exceeded the desired tension, the system will alert the user that installation was successful. If $\theta$ is above range, the level motor is turned on to decrease $\theta$ slightly. Once the level motor is turned off, the tension motor is turned on to increase the tension on the belts to the desired level. If, however, θ is below the desired range, the system will alert the user that installation was unsuccessful.

The iterative leveling algorithm described above is but one of many algorithms in which the leveling sensors and mechanism may be used alone or in combination with the tensioning sensors and mechanism to effectively automatically level the CRS. For example, the leveling mechanism and sensor may independently level the CRS. In this case, a simpler leveling algorithm would be employed in which the height of the elevating foot would be increased until the desired predetermined angle is achieved. The predetermined angle could either be based on a factory set value or an angle determined using the calibration procedure described above and depicted in FIG. 15B. In the case of a factory preset value, it would be necessary for the vehicle to be parked on relatively level ground. As described above, the calibration procedure can be used to install the seat base even when the ground is not level.

Alternatively, the leveling sensor could be used in combination solely with a tensioning mechanism whereby the tension on the belt is continually increased until the leveling sensors determine that the CRS has reached the correct angle. Similarly, the leveling mechanism could continue to increase the elevation of the foot until a predetermined belt tension as measured by the tension sensor is achieved. In that instance, the leveling mechanism is adjusted solely in response to input from the tensioning sensor. It is understood that the present invention could be used with any of these leveling algorithms.

Another possible automatic installation algorithm modifies level and tension independently to place the CRS in the desired orientation. Specifically, an installation process which modifies elevation of the foot and tension either simultaneously or sequentially may be useful in certain situations. For example, CRSs for use with the ISOFIX system, can be designed with the rotational angle adjustment system on top of a fixed frame so that the device can be first tightened and then leveled independently. In this case, the position of the rotational frame has no impact on the tension in the restraint system. Therefore, a simpler installation algorithm of tightening and then adjusting the angle is sufficient. It is preferable to design the LATCH restraints and supporting hardware in such a way as to direct forces both down towards the seat cushion and back toward the seat back.

The threshold values for angle (θ) and belt tension ($F_T$) are based on the recommended NHTSA CRS installation criteria or the recommendation of other scientific boards. For example, NHTSA recommends that the tension in each LATCH belt be 53.5-67 N (12-15 lbf). A controller implemented with a microcontroller may be reprogrammable and thus updateable when the criteria are updated. In addition, the algorithm can be updated by the user based on the user's experience with the CRS. The controller may also be configured to store usage data, with the ability to download and analyze data offline by the manufacturer.

Another common CRS installation failure is when users incorrectly twist the LATCH restraint's webbing while fastening them to the tethers. When the CRS controller detects this state, it can warn the user and prevent installation. One option for detecting that the restraint is twisted is to embed wires in the webbing fabric such as piezo-elements. Because of the cost and complexity of this solution, the preferred embodiment is a combination of mechanical guides that inhibit twisting of the LATCH restraint's webbing and sensors that determine when the LATCH restraints are oriented correctly into the attachment anchor points of the vehicle.

It is further envisioned that the CRS control system be able to determine whether a child is present in the seat. Sensors capable of detecting the child include one or more of a weight sensor in the infant carrier, a sensor for determining whether the harness is buckled, or a heat sensor, visual sensor, or strain gauge, for directly measuring the child. Accordingly, every time the system detects that a child is in the seat, the interface could provide feedback to the caregiver on the readiness and safety of the CRS. Such feedback may include, but is not limited, to confirmation that the seat is at the proper level, that the vehicle based restraint system is at the proper tension, that the infant carrier handle is at the correct position, that the LATCH restraints are not twisted, that the child restraints are at the proper tension, or that the child restraints are at the proper height. If any input is deemed unsafe by the system, the system can alert the caregiver or optionally make adjustments. Additionally the control system may provide feedback on the conditions of the vehicle such as the temperature, and optionally alert if the conditions are deemed unsafe. This process may occur on a rear facing infant carrier whenever it is detected that the infant carrier has been connected to the base.

It is important that this check be conducted every time a child is placed in the seat since even conditions that were checked during the installation process may change over time. For example, it is very common for a CRS that is installed with the passenger seat belt system to become accidentally detached when the seat belt is unbuckled. The automatic CRS can be configured with a seat belt tension sensor located on the CRS base to warn the user when the seat belt is unbuckled. When installed correctly, the seat belt passes over the seat belt tension sensor and exerts force against the CRS base. When the belt is too loose or unbuckled entirely the tension against the CRS base is decreased. In this case, the CRS warns the user that the CRS is unsafe for use and must be installed again. The arrangement of the seat belt tension sensor is similar to the arrangement of automatic tensioning mechanisms as depicted in FIG. 9.

Another common problem is that the hysteresis of the vehicle seat foam changes over time causing the tension in the LATCH straps and the angle of the CRS to change as well. In this case, the CRS controller could either alert the user or engage one or more of the tension or leveling drive systems to fix the issue.

When the check is conducted when a child is detected, the CRS control system can make recommendations to the user based on metadata, namely predefined rules. For example, if the child is detected to be below a certain weight or certain height, the system can recommend that the seat be installed in a rear facing orientation. If the total weight exceeds the recommended weight limit for LATCH, the CRS controller can recommend using the vehicle seat belt. If the current date exceeds the expiration date programmed at the factory, a warning can be issued. If the system has detected forces consistent with a crash that may have damaged the CRS, the caregiver can be alerted so that the child is not put in an unsafe seat.

The CRS interface may gather information on the height and weight of the child present. Optical sensors or contact sensors at varying heights can determine the height of a child's shoulders, which can be used to convey feedback to the caregiver on the proper use of the CRS. Optionally, the height of the restraints can be adjusted automatically or by the caregiver with the assistance of a motorized mechanism. Since the recommended height of the system depends not only on the height of the child, but the orientation of the CRS, the CRS can be equipped with sensors including, but not limited to, one or more pressure sensors in the base or an accelerometer to determine whether it is installed forward facing or rear facing.

Figure 16:
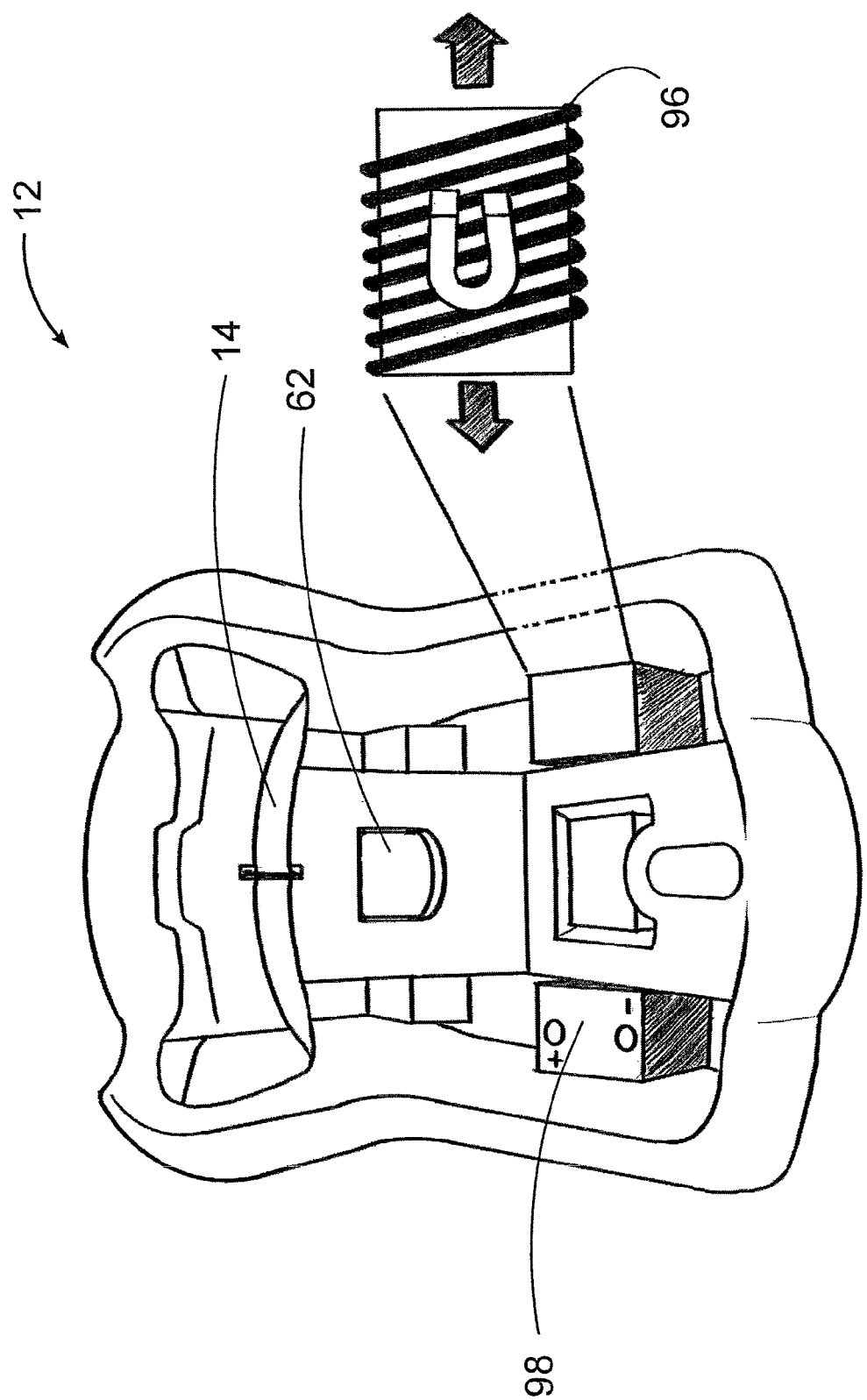
FIG. 16 is a perspective view of the carrier base of FIG. 2 with a battery and a self-generating power mechanism exposed.

One challenge in designing a commercially viable seat with electronics is reducing the burden on the caregiver of maintaining a sufficient battery level. The power providing elements of the CRS are depicted in FIG. 16. In the simplest configuration, the CRS includes a battery 98 for providing power to the motors and plurality of sensors. The battery 98 is located in the interior of the carrier base 12. The battery may be removable from the base and rechargeable. In addition, the CRS could be configured to receive power from the vehicle's power outlet (e.g., a cigarette lighter outlet). In that case, the CRS base would include a socket for receiving the power adapter. Power from the adapter could power the CRS during installation or recharge the battery. According to the embodiment of the CRS depicted in FIG. 16, the CRS base further comprises a self generating power production mechanism 96 connected to the battery 98 and plurality of CRS sensors. Since the CRS is mounted on a mobile platform (e.g., a motor vehicle), the power production mechanism is subject to forces as the vehicle is driven around. A linear generator is a very simple option for generating electric energy from the motion of the vehicle. A magnet internal to the CRS base can pass through a coil which will generate electricity that can be stored in a battery. Alternatively, other known mechanisms for generating power, such as a pendulum or piezoelectric element, could be used.

The CRS may be configured with a two level system for power consumption. One system is used only for monitoring the system parameters and controlling the user interface. This system is designed to be very low power. The second power system is used to drive the motors in the installation process and, therefore, uses higher amounts of energy. The power source for the first system is preferred to be a battery. The power supply for the second system may be a separate battery or may be an input from the vehicle's power jack. This secondary or backup system guarantees that power is preserved for the user interface.

Figure 17:
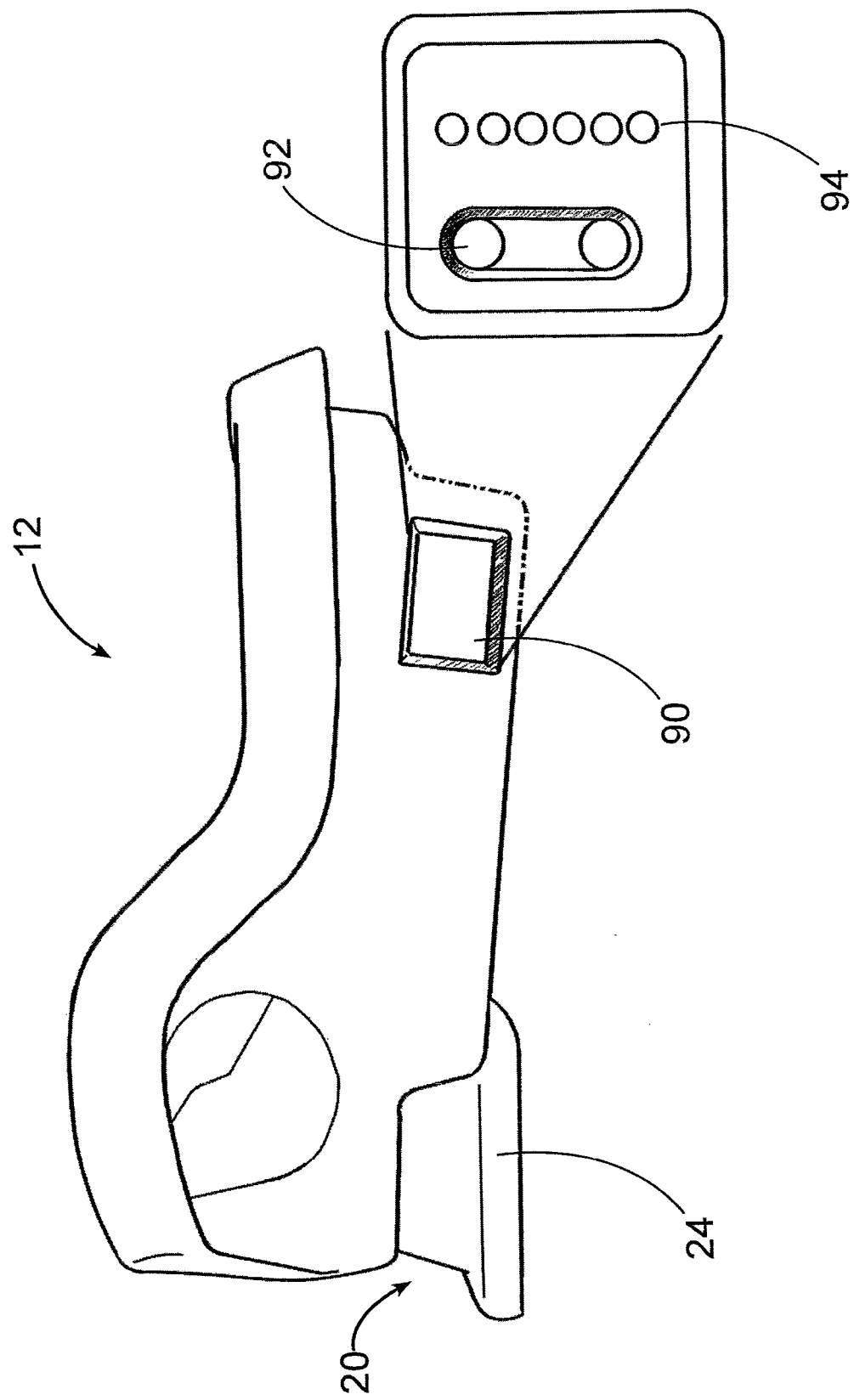
FIG. 17 is a side view of the carrier base of FIG. 2 with a control center of a user interface shown in an enlarged manner.

In one embodiment, the CRS controller further includes a user interface to receive user input to trigger the setup and installation procedures. As depicted in FIG. 17, the user interface components are assembled in a discrete package, representing a "control center." The control center 90 is located on the side of the infant carrier base 12. According to one embodiment, the user interface is a visual display including installation control buttons 92 for activating and directing the installation process. Optionally, the interface also includes a keypad, touch screen, voice recognition, remote control, or other inputs. The other inputs allow a user to enter metadata about the child to tailor installation for the characteristics of the specific child (e.g., height, weight, age). The CRS controller may interface, either through a wired connection or wirelessly, with mobile media devices (such as smartphones, laptops, tablet PCs, etc.) for control and feedback.

One unique feature of the CRS system is the ability to continually monitor the CRS and to provide information regarding the safety of the CRS to the user in real time. To accomplish this purpose, the control center 90 further includes safety indicators 94. The indicators provide feedback to the user as to the state of the CRS installation and general safety of the CRS. This data is relayed to the CRS controller and control center from the plurality of sensors located throughout the CRS. The information relayed may include confirmation that connectors are correctly locked to the LATCH system on the vehicle seat, information about the tension on the belt, CRS leveling, and/or conformation that the carrier is correctly attached to the base. According to one embodiment, the feedback is visual, having any form of LEDs. User interface components may also be distributed throughout the CRS at strategic locations (i.e., LEDs indicating proper belt latching placed nearby the latching locations). Alternative feedback indicators include an LCD display, or audible and/or tactile feedback devices.

The CRS controller may also direct reinstallation of the CRS base if monitoring sensors indicate that the installation is no longer correct (e.g., the base is no longer level or the belts have loosened). According to a monitoring and reinstallation algorithm, data is obtained from the level sensor. If the CRS is not level, the elevation of the foot and the tension of the belt are adjusted according to the iterative process described above.

In addition to the control center, the CRS controller may optionally communicate to a user through a wired connection or wirelessly with the vehicle's on board computer in order to integrate the data from the user interface into the vehicle control system or provide it to an external system such as OnStar.

Figure 18:
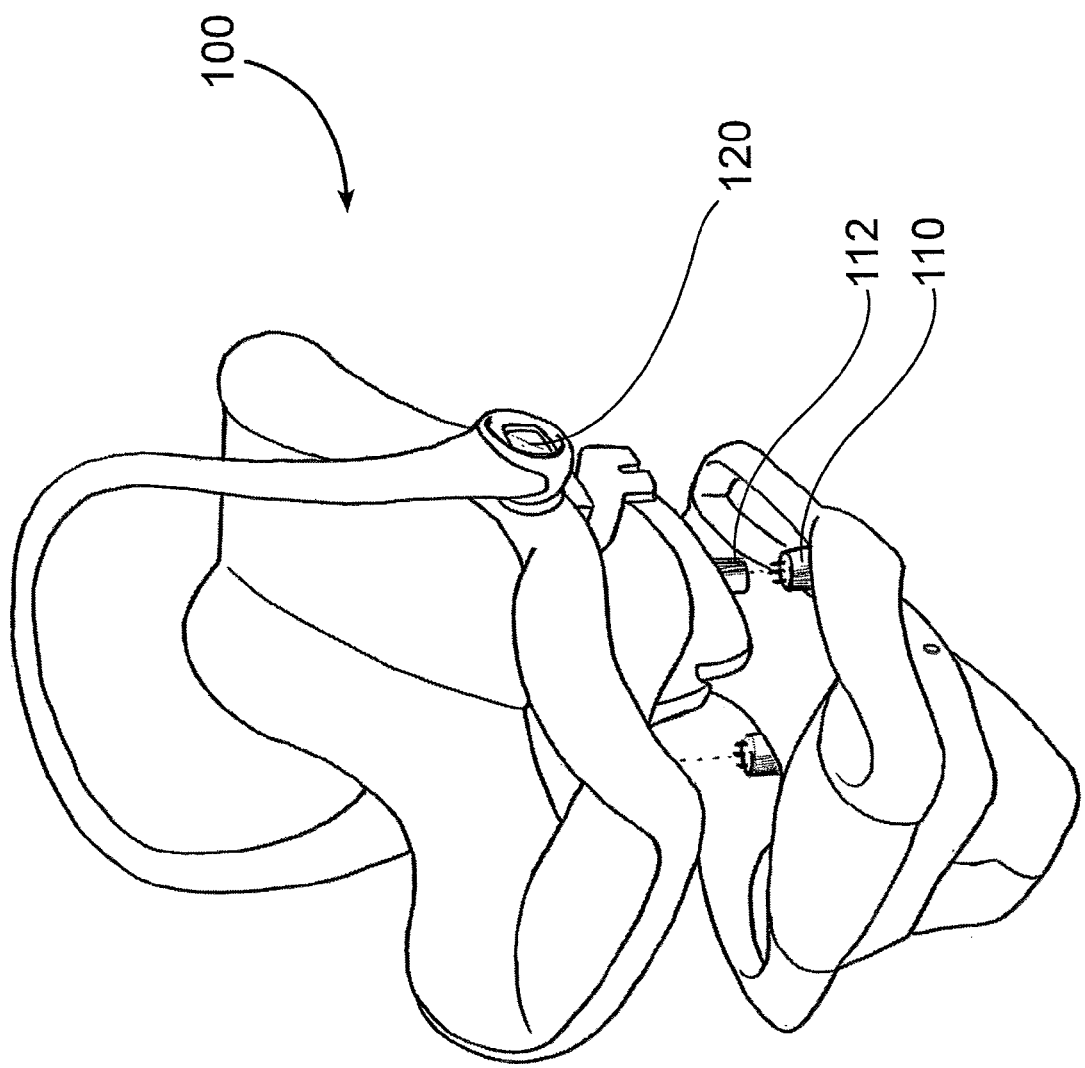
FIG. 18 is a perspective view of the base and carrier according to the present invention with a power connection socket for transferring power and data between the base and carrier.

According to another embodiment of the CRS control center, the control center is situated on the removable infant carrier rather than on the base for increased convenience for the user. In this case, power and communication may be passed from the base to the carrier by means of a common blind mate connector such as a fork and blade connector or set of contact plates. With such a connection, information on the position of the carrier handlebar can be sensed and included in the interface so that the user can be warned if it is not in the manufacturer's recommended use position or transmitted down to the base for additional processing by the control system there. One embodiment of the power connection is depicted in FIG. 18.

Figure 19:
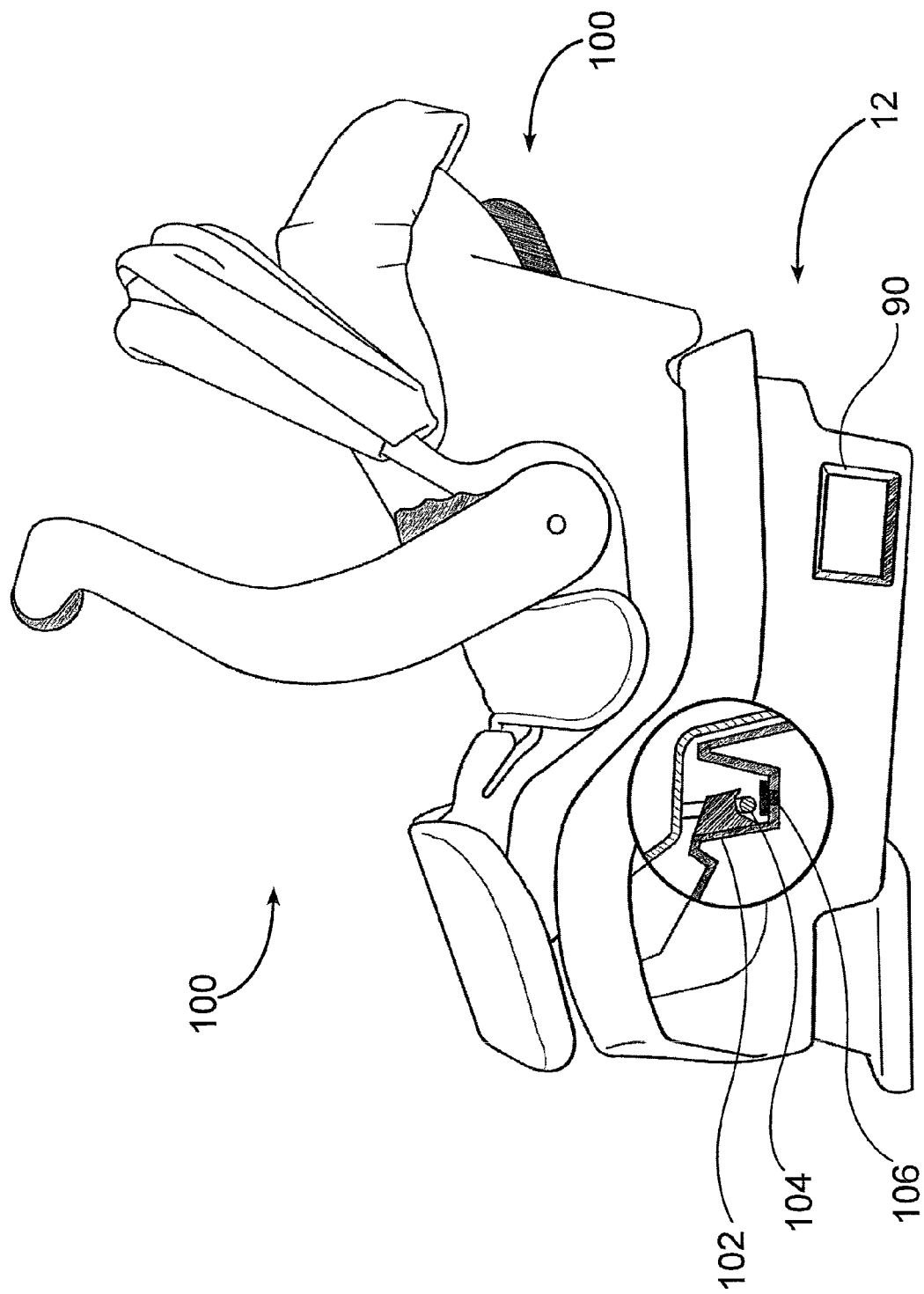
FIG. 19 is a side view of the carrier base of FIG. 2 connected to an infant carrier with an enlarged view of the latch mechanism for connecting the base to the carrier.
Figure 20A:
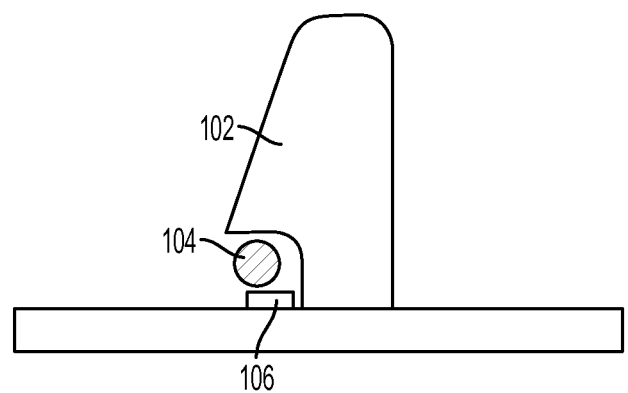
FIGS. 20A and 20B provide side and perspective views, respectively, illustrating the sensor configuration for connecting the CRS to a base in accordance with the present invention.
Figure 20B:
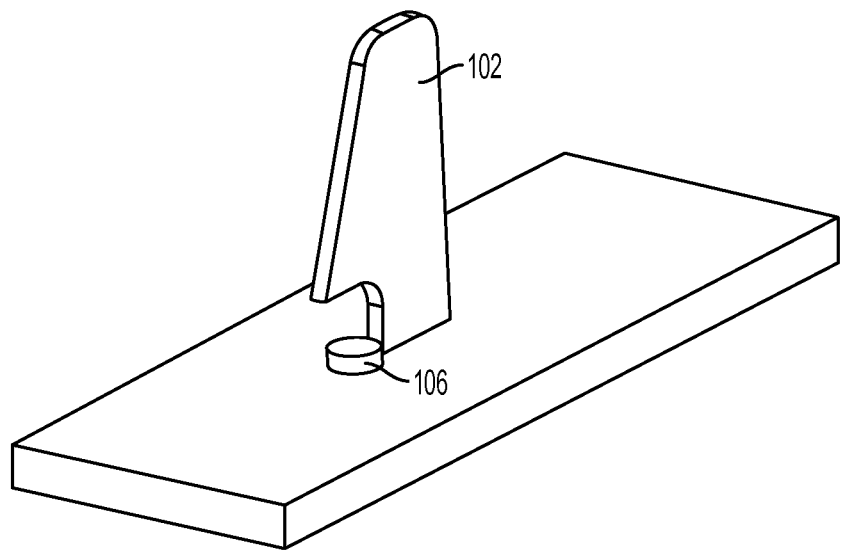

The CRS further comprises the infant carrier adapted to connect to the carrier base. FIGS. 19, 20A, and 20B are schematic drawings of the latching mechanism for connecting the carrier 100 to the base 12. The latching mechanism comprises a base connector tooth 102 on the base 12 adapted to surround and hold a bar 104 of the carrier 100. FIG. 19 is a schematic drawing of the carrier attached to the base with a partial section view of the latching mechanism. FIGS. 20A and 20B are schematic drawings of the latching mechanism detached from the carrier and base. As shown in each figure, the latch further comprises a metal detector sensor 106 for identifying the presence of the bar from the CRS connector. Based on data from the latch sensor, the control center 90 alerts the user when the carrier 100 and base 12 are correctly connected together. Optionally, the carrier and base are also connected by a power connection. As shown in FIG. 18, the base 12 includes a power socket 110 which connects to a power connector 112 on the infant carrier 100. The connection provides power to sensors and allows data from sensors located on the carrier to pass to the CRS controller and user interface. In the embodiment of the CRS depicted in FIG. 18, the control center 120 is located on the carrier 100.

With reference to FIG. 21, another accessory optionally included in the CRS is a restraint accessory comprising a motorized tensioner 130 for the infant harness 132. Harness webbing 132 is wound through a motorized tensioner 130 mechanism to tighten or loosen the harness 132. The harness 132 secures a child within the infant carrier 100. Included on the harness are harness tension sensors 134 to measure the tension against the child. Sensors which can be used for this purpose include strain gauges, pressure gauges, or other types of mechanical sensors.

Figure 22:
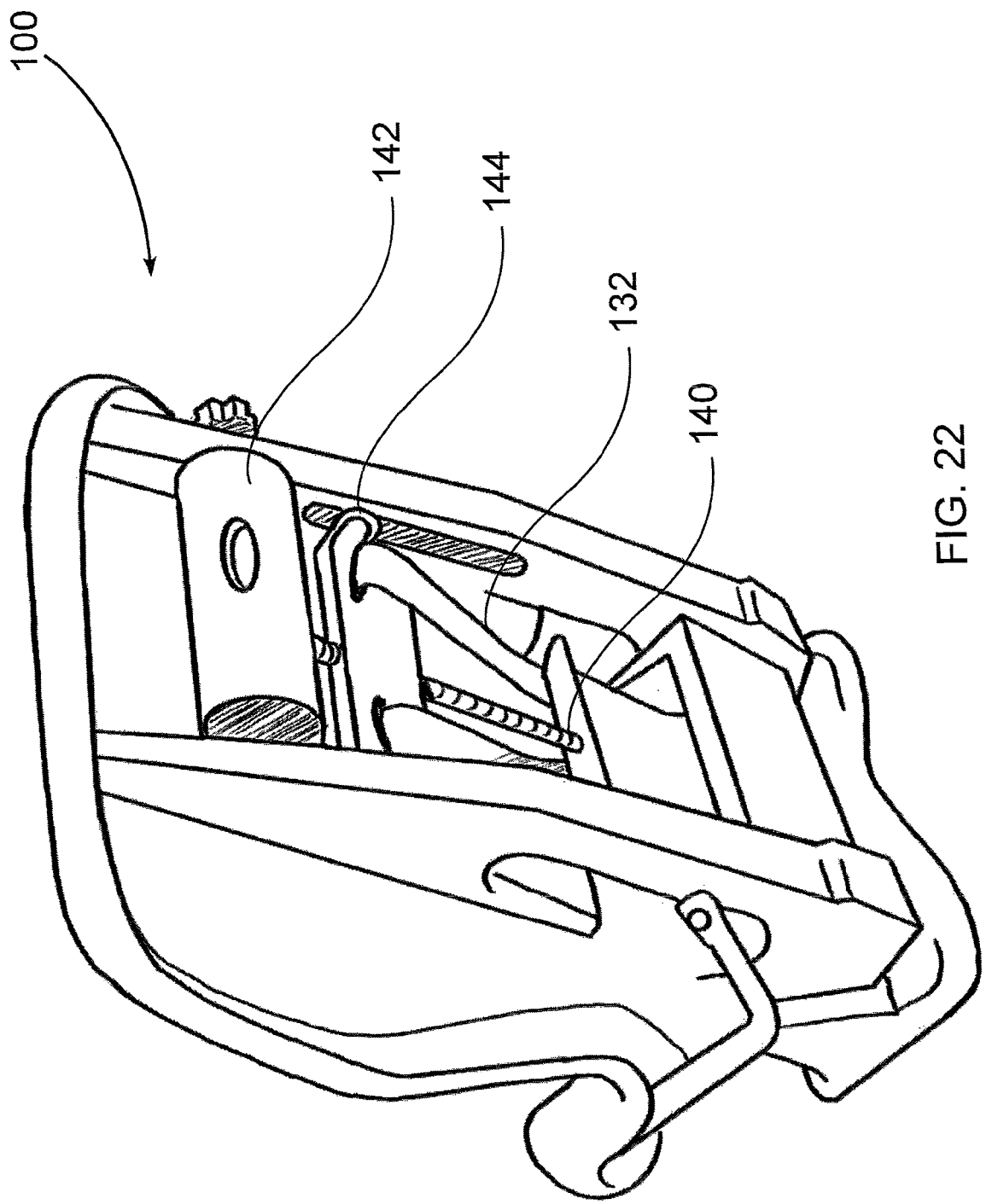
FIG. 22 is a perspective view of the back portion of the carrier of FIG. 21 with a motor mechanism for adjusting the height of a harness.

Another feature optionally included with the infant carrier is an automated height adjustment mechanism. FIG. 22 is a schematic drawing of the back of the infant carrier 100 with a height adjustment mechanism for adjusting the height of the harness 132 based on the size of the child. The carrier comprises a harness height adjust screw 140 attached to a motor mechanism 142 for height adjustment. The harness 132 is wound through the harness guide attached to the screw 140, which is coupled to the motor mechanism 142. The screw 140 is used to adjust the height of the harness by raising or lowering the harness guide and harness 132. A sensor 144 for determining the correct harness position for the child is included on the carrier 100 to measure the height of the child and to determine the correct level for the harness based on that measurement.

With reference to FIGS. 23 through 28, a variation to the full intelligent and automated CRS system is an intelligent latching device which can be adapted for use with an existing CRS 400. The intelligent restraint system could either replace the existing LATCH connectors included with the child car seat or could be designed to go between the existing CRS LATCH connectors and the vehicle attachment anchor points. In either case, much of the same technology described above still applies. The preferred embodiment for the tensioning drive is a ratchet and pawl system with a manual override for releasing tension on the webbing (see FIG. 14). The system comprises a belt 402 forming a loop for attachment to the CRS 400. A motorized latch and tensioner attachment 404 increases tension on the belt to hold the CRS in place.

More specifically, and with reference to FIGS. 24 through 27, one embodiment of the latch and tensioner attachment 404 includes a spindle 414 turned by a gear train 418 and driven by a motor 420. The motor 420, gear train 418, and spindle 414 are located within the attachment 404 and are encased within a motor/spindle cover 412 and gear train cover 419 respectively. The belt 402 is wound around the spindle 414. Webbing guides 408 located on exterior sides of the motor/spindle cover 412 direct the belt 402 to and from the spindle 414 through slots 410 in the motor/spindle cover 412. The tension on the belt 402 increases as the spindle 414 is wound. The motor 420 may be electrical or of any other suitable type such as hydraulic. A spindle end 416 extends beyond the motor/spindle cover 412 and can be turned manually by a user to adjust the tension of the belt 402.

Figure 23:
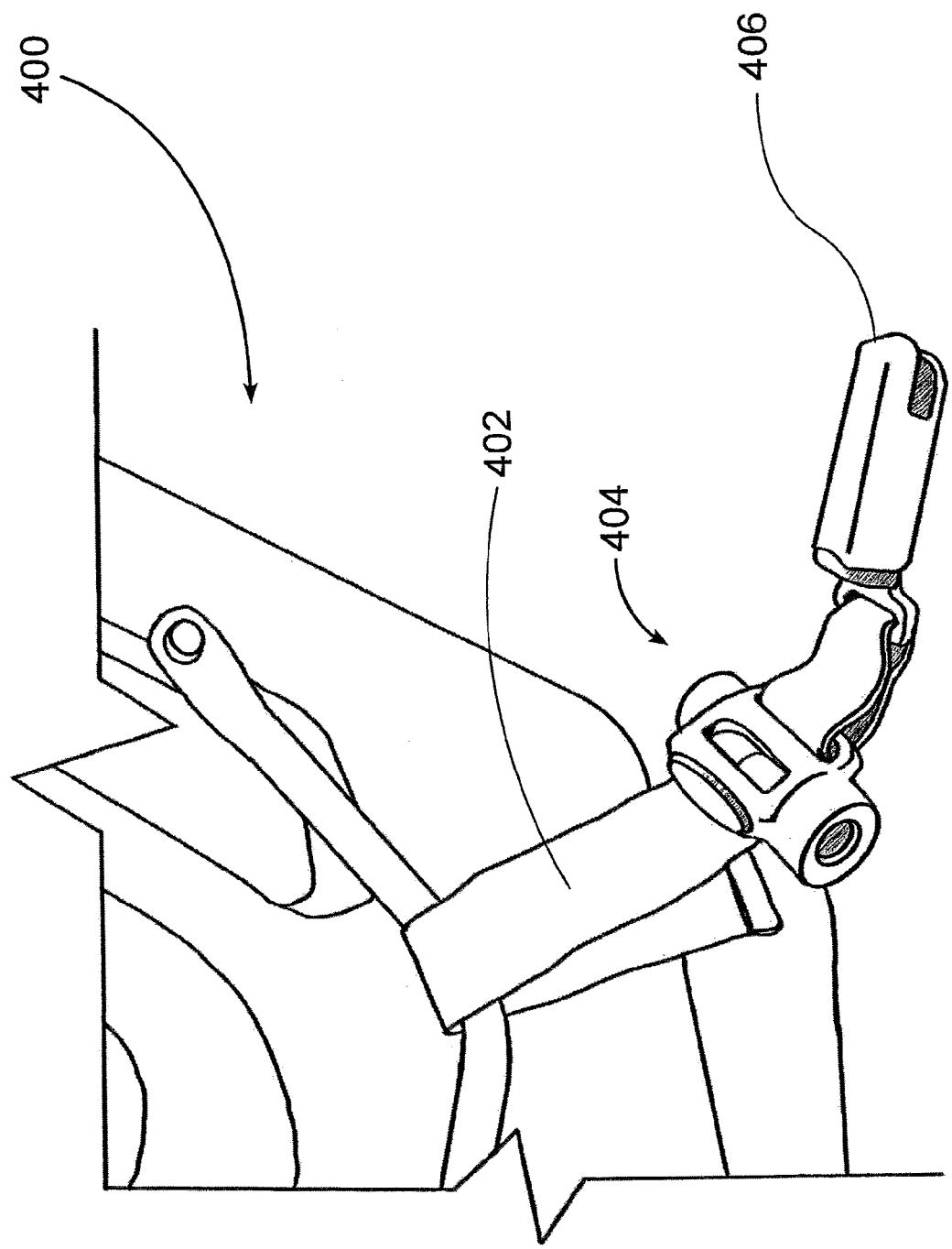
FIG. 23 is a perspective view of an intelligent latching device having a latch and tensioner mechanism and connectors for attachment to a LATCH system.
Figure 26:
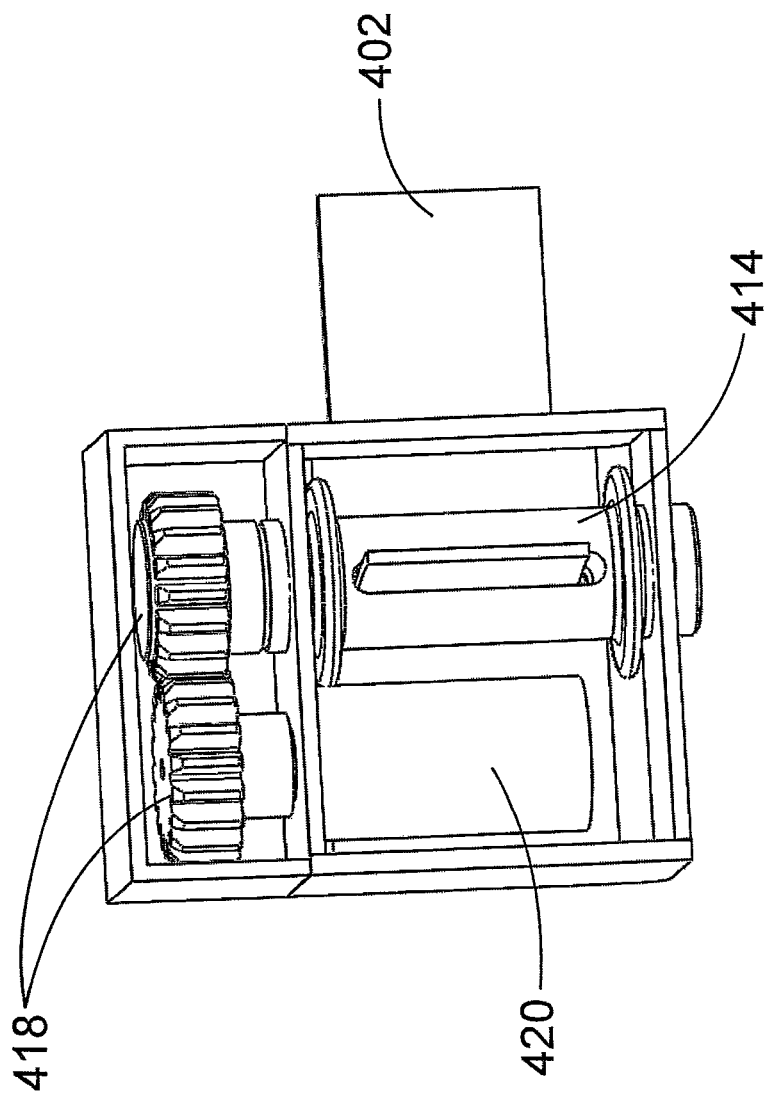
FIG. 26 is a cross sectional view of the latch and tensioner mechanism of FIG. 23 in which a motor, gear train, and spindle are visible.
Figure 27:
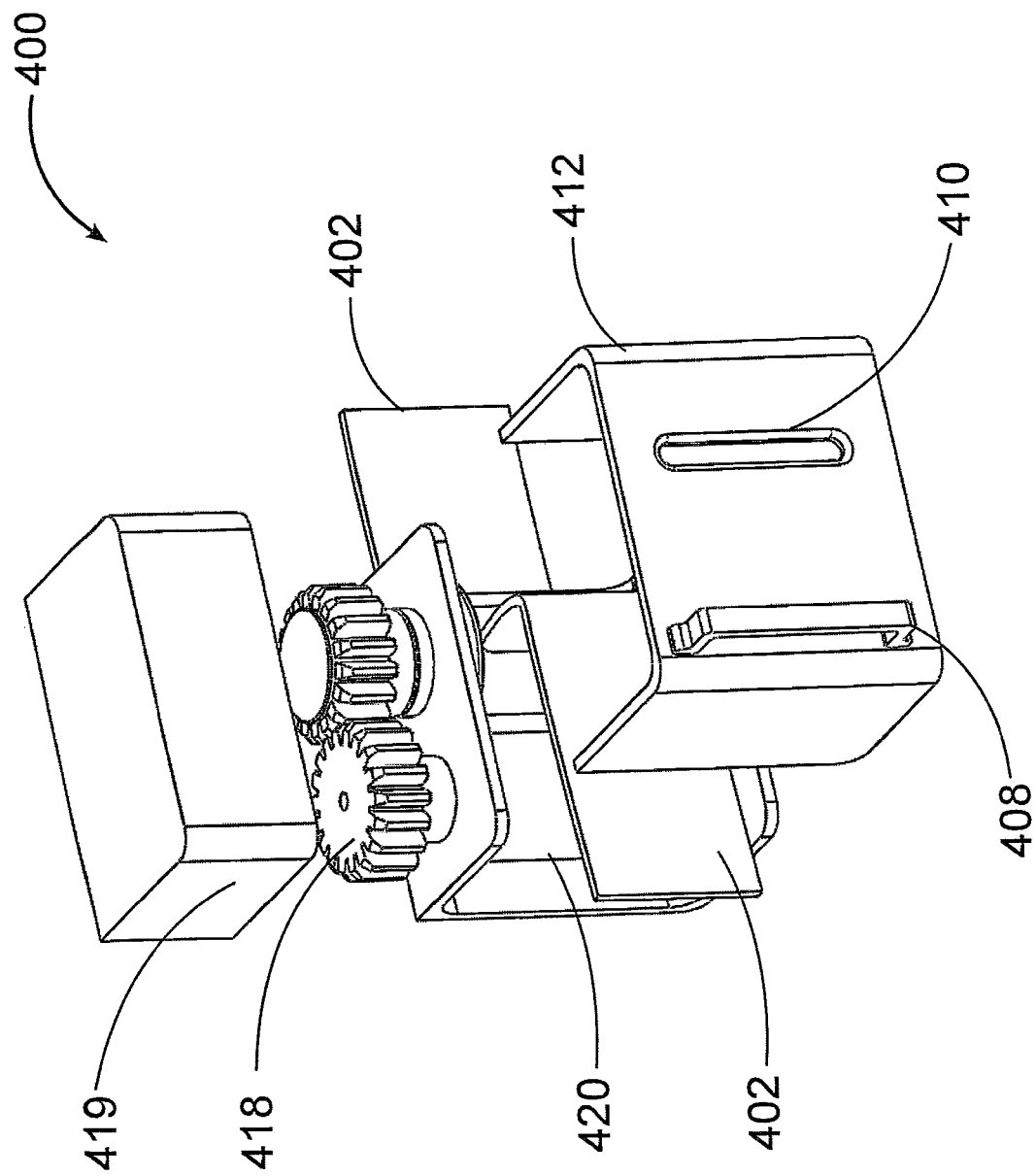
FIG. 27 is an exploded view of the latch and tensioner mechanism of FIG. 23.

As shown in FIG. 23, a connector 406 is connected to the motorized latch and tensioner attachment 404. The connector 406 is adapted for attachment to the CRS LATCH system. Sensors such as strain gauges could determine when connectors located on each side of the CRS are tightened to the correct tension. The left and right sides should preferably be coupled together electronically so that they can be synchronized during the installation process. There may be optionally a user interface to provide feedback including that the latches are engaged with the vehicle anchors, that tension in the belts is correct, battery level, etc. The user interface may also optionally guide the user through the installation process by soliciting metadata and providing audio or visual instructions. As with the power mechanism for the full CRS described above, the latching device could be self-powered by a generator powered by the motion of the vehicle.

Figure 28:
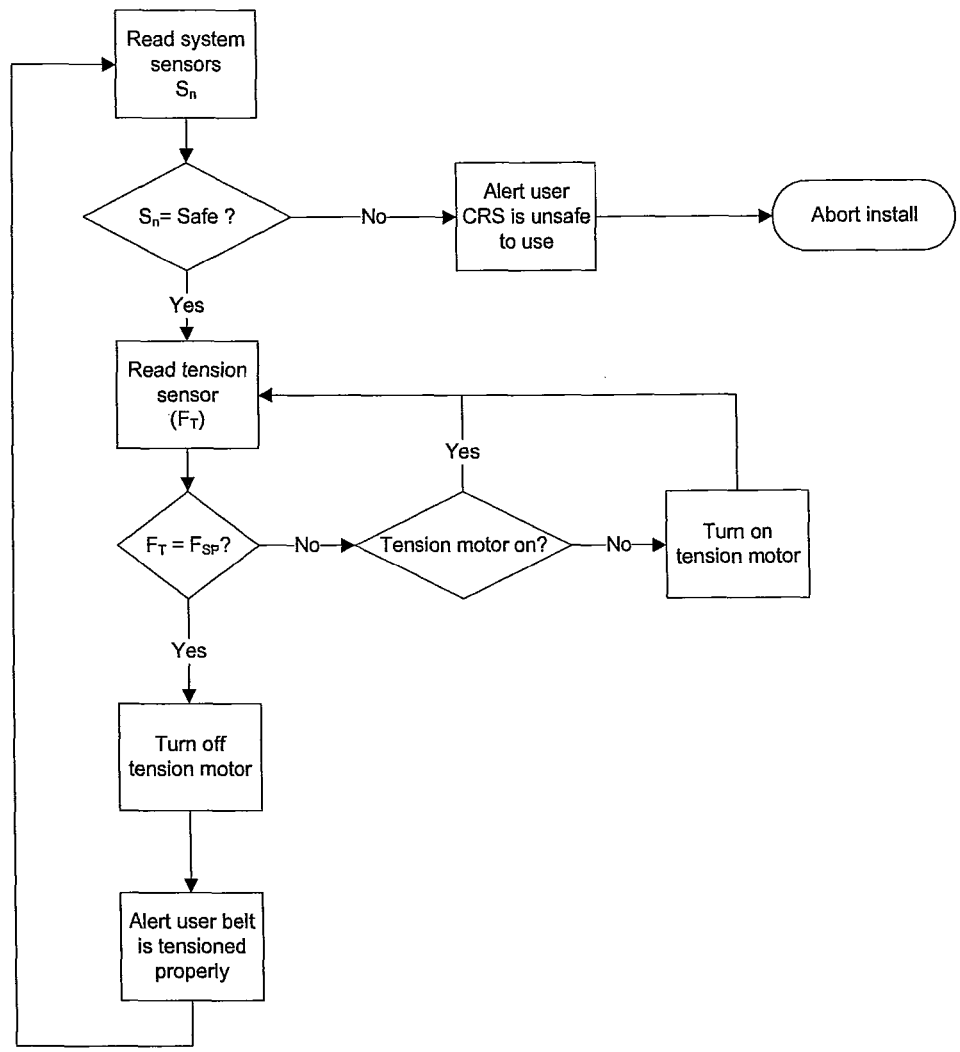
FIG. 28 is a flow chart depicting the process for increasing the tension of a belt for use with the intelligent latching device of FIG. 23.

FIG. 28 is a flow chart depicting the steps followed by the intelligent latching device for increasing the tension of the belt 402. As in other algorithms used with the CRS, data from the plurality of sensors is acquired to determine whether the CRS can be safely installed (e.g., vehicle is within an acceptable range of level, CRS is structurally sound, and connectors are latched to LATCH system or a seat belt). If the CRS is safe ($S_N$=yes) a reading from the tension sensor on the belt is obtained. If the tension ($F_T$) is less than the desired tension (Fsp) then the tension motor is turned. The motor remains on until $F_T$ is equal to (or within an acceptable range) of Fsp. At that point, the tension motor is turned off. The user is alerted that the belt tension is correct.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A base for a child car seat comprising:
    a seat base body secured to a seat of a vehicle;
    at least one of a belt tensioning system incorporated into the seat base body for receiving a belt that couples the seat base body to the seat of the vehicle, and a leveling system incorporated into the seat base body for leveling a child receiving portion relative to the seat of the vehicle; and
    a controller operatively coupled to at least one of the belt tensioning system and the leveling system,
    wherein the controller is configured to receive feedback from at least one sensor associated with the child seat and activate the leveling system to level the child receiving portion to a predetermined angle relative to the seat of the vehicle and/or the belt tensioning system to tension the belt to a predetermined tension, and
    wherein the controller is operably coupled with the at least one sensor and configured to output to a user interface an indication that the seat base body is properly secured to the seat of the vehicle.

2. The base of claim 1, wherein the user interface is mounted on the seat base body.

3. The base of claim 1, wherein the user interface is provided as a mobile media device.

4. The base of claim 1, wherein the child receiving portion is supported by the seat base body.

5. The base of claim 4, wherein
    the at least one sensor is associated with at least one of the seat base body and the child receiving portion and configured to determine whether the child receiving portion is at a proper level, the belt securing the seat base body to the seat of the vehicle is at a proper tension, a handle of the child receiving portion is at a correct position, the belt securing the seat base body to the seat of the vehicle is not twisted, a harness securing a child within the child receiving portion is at a proper tension and a proper height, or any combination thereof.

6. The base of claim 5, wherein the controller guides a user through a process of installing the base in the vehicle by soliciting information from the at least one sensor associated with at least one of the seat base body and the child receiving portion and providing at least one of audio and visual instructions via the user interface.

7. The base of claim 1, wherein the belt received by the belt tensioning system is at least one of a seat belt of the vehicle or a belt of a LATCH system.

8. The base of claim 1, wherein the base comprises the belt tensioning system incorporated into the seat base body for receiving the belt that couples the seat base body to the seat of the vehicle, and the leveling system incorporated into the seat base body for leveling the child receiving portion relative to the seat of the vehicle, and
wherein the leveling system is configured to raise and lower a foot connected to a bottom surface of the seat base body.

9. The base of claim 1, wherein the controller is configured to communicate with an on board computer of the vehicle.

10. A base for a child car seat comprising:
a seat base body secured to a seat of a vehicle;
a belt tensioning system incorporated into the seat base body for receiving a belt that couples the seat base body to the seat of the vehicle;
a leveling system incorporated into the seat base body for leveling a child receiving portion relative to the seat of the vehicle; and
a controller operatively coupled to at least one of the belt tensioning system and the leveling system,
wherein the controller is configured to receive feedback from at least one sensor associated with the child seat and activate the leveling system such that the leveling system levels the child receiving portion to a predetermined angle relative to the seat of the vehicle and the belt tensioning system such that the belt tensioning system tensions the belt to a predetermined tension.

11. The base of claim 10, further comprising a user interface operatively connected to the controller.

12. The base of claim 11, wherein the user interface is mounted on the seat base body.

13. The base of claim 11, wherein the user interface is provided as a mobile media device.

14. The base of claim 11, wherein the user interface comprises a display providing a visual indication to a user that the seat base is properly secured to the seat.

15. The base of claim 10, wherein the at least one sensor is associated with at least one of the seat base body and the child receiving portion and configured to determine whether the child receiving portion is at a proper level, the belt securing the seat base body to the seat of the vehicle is at a proper tension, a handle of the child receiving portion is at a correct position, the belt securing the seat base body to the seat of the vehicle is not twisted, a harness securing a child within the child receiving portion is at a proper tension and a proper height, or any combination thereof.

16. The base of claim 10, wherein the controller is operably coupled with the at least one sensor and configured to output to a user interface an indication that the seat base body is properly secured to the seat of the vehicle.

* * * * *